US010277791B2

(12) United States Patent
Ha et al.

(10) Patent No.: US 10,277,791 B2
(45) Date of Patent: Apr. 30, 2019

(54) CAMERA MODULE AND OPTICAL APPARATUS FOR MINIMIZING THE WHOLE HEIGHT THEREOF

(71) Applicant: LG INNOTEK CO., LTD., Seoul (KR)

(72) Inventors: Tae Min Ha, Seoul (KR); Hyun Ah Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 81 days.

(21) Appl. No.: 15/414,761

(22) Filed: Jan. 25, 2017

(65) Prior Publication Data

US 2017/0214831 A1 Jul. 27, 2017

(30) Foreign Application Priority Data

Jan. 25, 2016 (KR) .................. 10-2016-0008532
Jan. 25, 2016 (KR) .................. 10-2016-0008534
Jan. 28, 2016 (KR) .................. 10-2016-0010739

(51) Int. Cl.
| | |
|---|---|
| H04N 5/225 | (2006.01) |
| H01L 31/0203 | (2014.01) |
| G02B 27/64 | (2006.01) |
| G02B 7/08 | (2006.01) |
| H04M 1/02 | (2006.01) |
| H04B 1/3827 | (2015.01) |

(52) U.S. Cl.
CPC ............ *H04N 5/2257* (2013.01); *G02B 7/08* (2013.01); *G02B 27/646* (2013.01); *H04N 5/2253* (2013.01); *H04N 5/2254* (2013.01); *H04B 1/3827* (2013.01); *H04M 1/0264* (2013.01)

(58) Field of Classification Search
CPC .. H04N 5/2252; H04N 5/2253; H04N 5/2254; H04N 5/2257; G02B 27/646; H04M 1/026; H04M 1/0264
See application file for complete search history.

(56) References Cited

U.S. PATENT DOCUMENTS

| | | | | |
|---|---|---|---|---|
| 7,428,111 B2* | 9/2008 | Shibata | ............... | H04N 5/2254 348/E5.028 |
| 7,643,081 B2* | 1/2010 | Webster | ............... | H04N 5/2253 348/340 |
| 9,225,887 B1* | 12/2015 | Hsu | ............... | H04N 5/2254 |
| 2008/0023545 A1* | 1/2008 | Feng | ............... | G02B 7/02 235/454 |
| 2010/0079642 A1* | 4/2010 | Kurimoto | ............... | G02B 7/02 348/294 |
| 2011/0102652 A1* | 5/2011 | Lu | ............... | H04N 5/2253 348/294 |
| 2012/0044411 A1* | 2/2012 | Wang | ............... | H04N 5/2257 348/374 |

* cited by examiner

*Primary Examiner* — Ngoc Yen T Vu
(74) *Attorney, Agent, or Firm* — Saliwanchik, Lloyd & Eisenschenk

(57) ABSTRACT

The present disclosure relates to a camera module, the camera module including a circuit board, an image sensor disposed on an upper surface of the circuit board, a current carrying part electrically connecting the image sensor and the circuit board, and a base disposed on the upper surface of the circuit board, wherein the base is not overlapped with the image sensor and the current carrying part in a direction of an optical axis.

17 Claims, 8 Drawing Sheets

(a)

(b)

CAMERA MODULE AND OPTICAL APPARATUS FOR MINIMIZING THE WHOLE HEIGHT THEREOF

CROSS-REFERENCE TO RELATED APPLICATIONS

This application claims priority under 35 U.S.C. § 119 to Korean Patent Application Nos. 10-2016-0008532 and 10-2016-0008534, filed Jan. 25, 2016; and 10-2016-0010739, filed Jan. 28, 2016, which are hereby incorporated by reference in their entirety.

TECHNICAL FIELD

Exemplary embodiments of the present disclosure may relate to a camera module and an optical apparatus.

BACKGROUND

The technology described in this section is merely intended to provide background, information of an exemplary embodiment of the present disclosure, and does not mean the prior art.

Concomitant with wide propagation of various mobile terminals (smart phones) and commercialization of wireless Internet services, demands by consumers related to the mobile terminals are diversified, and various types of additional equipment are attached to the mobile terminals.

Among the various types of additional equipment, a camera module may be a representative device capable of photographing a subject in a still image or in a moving picture.

Meanwhile, recent camera modules are equipped with AF (Auto Focus) functions and handshake correction functions as a basic specification. However, the conventional camera modules having the handshake correction function suffer from disadvantages in that a camera module part alone on the mobile terminal protrudes from the mobile terminal due to increased whole length of the camera module, which is resultant from use of the handshake correction function.

Meantime, there is a need of alignment of a lens module with an optical axis of an image sensor in order to assemble a camera module. The optical axis alignment may be performed by full curing for assembly of a camera module prior to temporary curing thereof, while the optical axis alignment is being completed.

On the other hand, the conventional camera module suffers from drawbacks in that the temporary curing for assembly of a camera module is not performed in a proper manner to twist a position during movement; and a time for temporary curing process becomes increased in order to integrate temporary adhesion stability.

BRIEF SUMMARY

Technical Challenge

In order to solve at least one or more of the above problems and/or disadvantages in whole or in part and to provide at least advantages described hereinafter, a first exemplary embodiment of the present disclosure is to provide a camera module minimized in the whole length to an optical axis direction. The present disclosure provides an optical apparatus including the camera module.

In order to solve at least one or more of the above problems and/or disadvantages in whole or in part, a second exemplary embodiment of the present disclosure is to provide a camera module configured to improve a curing stability of IR (Infrared) rays and secure reliability for processing and module by changing an exterior shape of a sensor base or a housing of a lens driving unit.

The present disclosure provides a camera module enlarged in light irradiation angle in order to effectively perform an IR curing in an AA (Active Alignment) process. Furthermore, the present disclosure provides an optical apparatus including a camera module.

Technical Solution

In accordance with a first exemplary embodiment of the present invention, there is provided a camera module, the camera module comprising: a circuit board; an image sensor disposed on an upper surface of the circuit board; a current carrying part electrically connecting the image sensor and the circuit board; and a base disposed on the upper surface of the circuit board, wherein the base is not overlapped with the image sensor and the current carrying part in a direction of an optical axis.

In some exemplary embodiments, the camera module may further comprise: a lens module arranged at an upper side of the image sensor; and a filter interposed between the lens module and the image sensor, wherein the base may include a first support unit supporting a part of a bottom surface of the filter, a second support unit disposed opposite to a lateral surface of the filter, and a third support unit arranged at an upper surface of the circuit board to connect the first and second support units.

In some exemplary embodiments, a bottom surface of the first support unit may contact the upper surface of the circuit board.

In some exemplary embodiments, a width of the first support unit in a direction perpendicular to a direction of an optical axis (hereinafter referred to as optical axis direction) may be broadened toward an upper side from a lower end of the first support unit.

In some exemplary embodiments, an upper surface of the first support unit and an inner lateral surface of the first support unit may form an acute angle.

In some exemplary embodiments, a height of the second support unit in the optical axis direction may correspond to a height of the filter in the optical axis direction.

In some exemplary embodiments, an upper surface of the filter and an upper surface of the second support unit may be arranged on one plane.

In some exemplary embodiments, the filter may be spaced apart from the image sensor and the current carrying part.

In some exemplary embodiments, the filter may be an IR absorption filter or an IR reflection filter.

In some exemplary embodiments, the current carrying part may include a wire coupled to an upper surface of the image sensor and an upper surface of the circuit board:

In some exemplary embodiments, the wire may be arranged at an external side of the image sensor.

In some exemplary embodiments, the camera module may further comprise: a cover member arranged at an upper side of the base; a bobbin arranged at an inner side of the cover member; a first coil arranged at the bobbin; a magnet interposed between the cover member and the bobbin to be opposite to the first coil; and a second coil arranged at the base to be opposite to the magnet.

In some exemplary embodiments, the camera module may further comprise a circuit element unit arranged at an upper surface of the circuit board and arranged at an outside of the image sensor, wherein the base may be formed with an element accommodation part accommodating at least a part of the circuit element unit.

In some exemplary embodiments, the element accommodation part may pass through the base to an optical axis direction.

In some exemplary embodiments, the base may be prevented from being overlapped with the circuit element unit in an optical axis direction.

In some exemplary embodiments, the element accommodation part may include a first accommodation part arranged at one side of the image sensor and a second accommodation part arranged at the other side of the image sensor.

In some exemplary embodiments, the circuit element unit may include first to fourth circuit elements, each element mutually spaced apart from the other element, and the element accommodation part may include a first accommodation part accommodating the first and second circuit elements, and a second accommodation part accommodating the third and fourth circuit elements, and the first accommodation part and the second accommodation part may be spaced apart from each other by the base.

In some exemplary embodiments, the camera module may further comprise: a cover member arranged at an upper side of the base; a lens module arranged at an upper side of the image sensor; and a filter interposed between the lens module and the image sensor, wherein the base may include a filter support part supporting the filter, and a cover member support part supporting the cover member, and wherein the element accommodation part may be arranged between the filter support part and the cover member support part.

The optical apparatus according to a first exemplary embodiment of the present disclosure may comprise: a main body; a camera module arranged at the main body to photograph an image of a subject; and a display part arranged at one surface of the main body to output the image photographed by the camera module, wherein the camera module may comprise: a circuit board; an image sensor disposed on an upper surface of the circuit board; a current carrying part electrically connecting the image sensor and the circuit board; and a base disposed at the upper surface of the circuit board, wherein the base is not overlapped with the image sensor and the current carrying part in a direction of an optical axis.

In some exemplary embodiments, the optical apparatus may further comprise a circuit element unit arranged at an upper surface of the circuit board, and arranged at an outside of the image sensor, wherein the base may be formed with an element accommodation part accommodating at least a part of the circuit element unit.

A camera module according to a first exemplary embodiment of the present disclosure may comprise: a circuit board; an image sensor disposed on an upper surface of the circuit board; a current carrying part electrically connecting the image sensor and the circuit board; and a base disposed on the upper surface of the circuit board, wherein the base may be prevented from being overlapped with the image sensor and the current carrying part in an optical axis direction.

The camera module may include a lens module arranged at an upper side of the image sensor, and a filter interposed between the lens module and the image sensor, wherein the base may include a first support unit supporting a part of a bottom surface of the filter, a second support unit disposed opposite to a lateral surface of the filter, and a third support unit disposed at an upper surface of the circuit board to connect the first and second support units.

In some exemplary embodiments, a bottom surface of the first support unit may contact the upper surface of the circuit board.

In some exemplary embodiments, a width of the first support unit in a direction perpendicular to a direction of the optical axis direction may be broadened toward an upper side from a lower end of the first support unit.

In some exemplary embodiments, a height of the second support unit in the optical axis direction may correspond to a height of the filter in the optical axis direction.

In some exemplary embodiments, the filter may be spaced apart from the image sensor and the current carrying part.

In some exemplary embodiments, the filter may include at least one or more of an IR absorption filter and an IR reflection filter.

In some exemplary embodiments, the current carrying part may include a wire disposed at an outside of the image sensor.

In some exemplary embodiments, the camera module may further include: a cover member disposed at an upper side of the base; a bobbin disposed at an inner side of the cover member; a first driving part disposed at the bobbin; a second driving part interposed between the cover member and the bobbin to be disposed opposite to the first driving part; and a third driving part disposed at the bobbin to be positioned opposite to the second driving part.

In some exemplary embodiments, the first driving part may include a first coil unit, the second driving part may include a magnet unit and the third driving part may include a second coil unit.

The optical apparatus according to a first exemplary embodiment of the present disclosure may comprise: a circuit board; an image sensor disposed at an upper surface of the circuit board; a current carrying part electrically connecting the image sensor and the circuit board; and a base disposed at the upper surface of the circuit board, wherein the base may be prevented from being overlapped with the image sensor and the current carrying part in an optical axis direction.

A camera module according to a modification of a first exemplary embodiment of the present disclosure may comprise: a circuit board; an image sensor disposed at an upper surface of the circuit board; a circuit element unit disposed at an upper surface of the circuit board to be positioned at an outside of the image sensor; and a base disposed at the upper surface of the circuit board, wherein the base may be formed with an element accommodation part accommodating at least a part of the circuit element unit.

In some exemplary embodiments, the element accommodation part may pass through the base in an optical axis direction.

In some exemplary embodiments, the base may be prevented from being overlapped with the circuit element unit in an optical axis direction.

In some exemplary embodiments, the element accommodation part may include a first accommodation part disposed at one side of the image sensor, and a second accommodation part disposed at the other side of the image sensor.

In some exemplary embodiments, the circuit element unit may include first to fourth circuit elements, each element mutually spaced apart from the other element, and the element accommodation part may include a first accommodation part accommodating the first and second circuit elements, and a second accommodation part accommodating the third and fourth circuit elements, and the first accommodation part and the second accommodation part may be spaced apart from each other by the base.

In some exemplary embodiments, the camera module may further comprise: a cover member disposed at an upper side of the base; a lens module disposed at an upper side of the image sensor; and a filter interposed between the lens module and the image sensor, wherein the base may include a filter support part supporting the filter, and a cover member support part supporting the cover member, and wherein the element accommodation part may be disposed between the filter support part and the cover member support part.

In some exemplary embodiments, the filter support part may include a first support unit supporting a part of a bottom surface of the filter, a second support unit disposed opposite to a lateral surface of the filter, and a third support unit disposed at an upper surface of the circuit board to connect the first support unit and the second support unit, wherein a length to an optical axis direction of the cover member support part may correspond to a length to an optical axis direction of the first support unit.

In some exemplary embodiments, a length to an optical axis direction of the second support unit may correspond to a length to an optical axis direction of the filter.

In some exemplary embodiments, the filter may include at least one or more of an IR absorption filter and an IR reflection filter.

In some exemplary embodiments, the camera module may further include: a cover member disposed at an upper side of the base; a bobbin disposed at an inner side of the cover member; a first driving part disposed at the bobbin; a second driving part interposed between the cover member and the bobbin to be disposed opposite to the first driving part; and a third driving part disposed at the base to be positioned opposite to the second driving part.

In some exemplary embodiments, the first driving part may include a first coil unit, the second driving part may include a magnet unit and the third driving part may include a second coil unit.

An optical apparatus according to a modification of a first exemplary embodiment of the present disclosure may comprise: a circuit board; an image sensor disposed at an upper surface of the circuit board; a circuit element unit disposed at an upper surface of the circuit board to be positioned at an outside of the image sensor; and a base disposed at the upper surface of the circuit board, wherein the base may be formed with an element accommodation part accommodating the circuit element unit to pass through the base to an optical axis direction.

A camera module according to a second exemplary embodiment of the present disclosure may comprise: a circuit board; an image sensor disposed at an upper surface of the circuit board; a sensor base disposed at an upper surface of the circuit board to accommodate the image sensor at an inside thereof; and a lens driving unit coupled to the sensor base, wherein the sensor base may include a first external surface, a second external surface adjacent to (neighboring with) the first external surface, and a first corner part interposed between the first external surface and the second external surface, and wherein the sensor base may include a guide part disposed at the first corner part and formed by being caved in at a part of an upper surface of the sensor base.

In some exemplary embodiments, a length to an optical axis direction from a center part of the first external surface may be longer than a length to an optical axis direction at a first corner part side.

In some exemplary embodiments, the guide part may include a chamfer part having a chamfer shape.

In some exemplary embodiments, the guide part may include a first chamfer part having a first slope, and a second chamfer part having a second slope different from the first slope, wherein the first chamfer part and the second chamfer part may be continuously arranged from an inside to an outside.

In some exemplary embodiments, a length to an optical axis direction of the first external surface may grow smaller toward a first corner part from a center of the first external surface.

In some exemplary embodiments, the sensor base may further include a through hole passing through the sensor base to an optical axis direction, wherein the through hole may be disposed at an upper side of the image sensor, a first internal surface of the sensor base forming the through hole is disposed opposite to the first external surface, and a length to an optical axis direction at a center of the first external surface may be equal to or longer than a length to an optical axis direction of the first internal surface.

In some exemplary embodiments, the sensor base may include a filter accommodation part formed by being caved in (sunk) from a bottom side at a part of the upper surface of the sensor base, wherein the filter accommodation part may accommodate an IR (Infrared) filter, and wherein the IR filter may be disposed at an upper side of the image sensor.

In some exemplary embodiments, the camera module may further comprise an adhesive member interposed between the lens driving unit and the upper surface of the sensor base, wherein the adhesive member may be cured by IR.

In some exemplary embodiments, the sensor base may further include: a third external surface adjacent to (neighboring with) the second external surface; a fourth external surface adjacent to the first external surface and the third external surface; a second corner part interposed between the second external surface and the third external surface; a third corner part interposed between the third external surface and the fourth external surface; and a fourth corner part interposed between the fourth external surface and the first external surface, wherein the guide part may be respectively disposed at the first to fourth corner part of the sensor base.

In some exemplary embodiments, the lens driving unit may include: a bobbin coupled by a lens module; a housing disposed at an outside of the bobbin; a first elastic member coupled to the bobbin and the housing; a first driving part disposed at the bobbin; and a second driving part disposed at the housing and positioned opposite to the first driving part.

There is provided an optical apparatus according to a second exemplary embodiment of the present disclosure, the optical apparatus comprising: a circuit board; an image sensor disposed at an upper surface of the circuit board; a sensor base disposed at an upper surface of the circuit board to accommodate the image sensor at an inside thereof; and a lens driving unit coupled to an upper side of the sensor base, wherein the sensor base may include a first external surface, a second external surface adjacent to (neighboring with) the first external surface, and a first corner part interposed between the first external surface and the second external surface, and wherein the sensor base may include a guide part disposed at the first corner part and formed by being caved in at a part of an upper surface of the sensor base.

Advantageous Effect

An FBL (Flange Back Length), a distance from an upper surface of an image sensor to a bottom surface of a lens module can be minimized, through the first exemplary embodiment of the present disclosure.

A thickness of a base can be reduced by opening a ceiling of a base at an upper side of a circuit element, through the modification according to the first exemplary embodiment of the present disclosure.

Furthermore, it may be possible to reduce a position of a bottom end surface of a lens driving unit when a relevant design is applied.

An IR (Infrared) introduction space can be enlarged by securing a space between a corner of a sensor base and a corner of a lens driving unit, through the second exemplary embodiment of the present disclosure.

Furthermore, it is possible to increase a temporary stability for a lens position due to obtainment of IR curing energy.

Still furthermore, productivity can be increased by decrease in a curing time.

In addition, a size that is increased by supplementary operation can be prevented by providing a space capable of performing a supplemental operation for additional adhesive, using an external corner space. That is, an over-dimensional error can be prevented that may occur after the supplemental operation for additional adhesive in order to increase an adhesive power between a sensor base and a lens driving unit.

DETAILED DESCRIPTION

Figure 1:
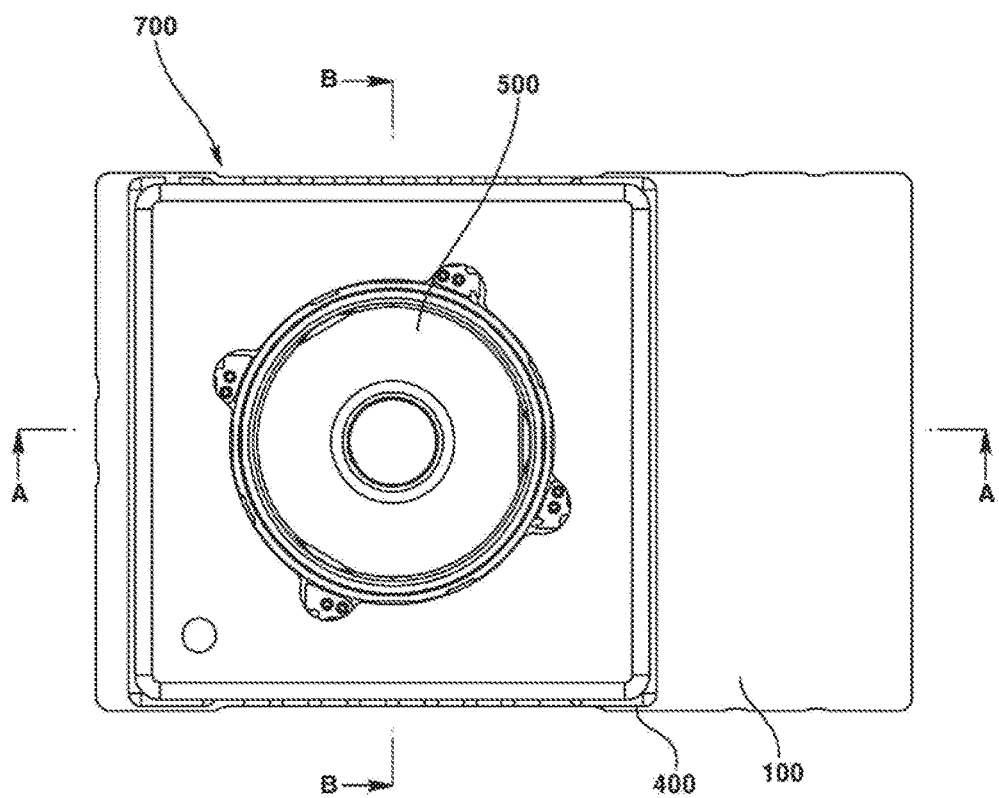
FIG. 1 is a plane view illustrating a camera module according to a first exemplary embodiment of the present disclosure.

Hereinafter, exemplary embodiments of the present disclosure are described in detail with reference to the accompanying drawings. It will be appreciated that for simplicity and/or clarity of illustration, elements illustrated in the figure have not necessarily been drawn to scale. For example, the dimensions of some of the elements may be exaggerated relative to other elements for clarity. Accordingly, in some embodiments, well-known processes, well-known device structures and well-known techniques are not illustrated in detail to avoid unclear interpretation of the present disclosure. The same reference numbers will be used throughout the specification to refer to the same or like parts.

It will be understood that, although the terms first, second, A, B, (a), (b), etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

Thus, a first element, component, region, layer, or section discussed below could be termed a second element, component, region, layer, or section without departing from the teachings of example embodiments.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled", and "connected" may mean that two or more elements do not contact each other but are indirectly joined together via another element or intermediate elements.

The "optical axis direction" hereinafter used may be defined as an optical axis direction of a lens module while being coupled to an optical lens assembly. Meantime, the "optical axis direction" may be interchangeably used with a up/down direction, a z axis direction, and a vertical direction.

The below-used "auto focus function" may be defined as a function of matching a focus to a subject by adjusting a distance from an image sensor by moving a lens module to an optical axis direction in response to a distance from a subject in order to obtain a clear image of the subject by the image sensor.

The below-used "handshake correction function" may be defined as a function to move or tilt a lens module to an optical axis direction and vertical direction in order to offset a vibration (movement) generated onto an image sensor by an external force. Meantime, the "handshake correction" may be interchangeably used with "OIS (Optical Image Stabilization)".

Figure 7:
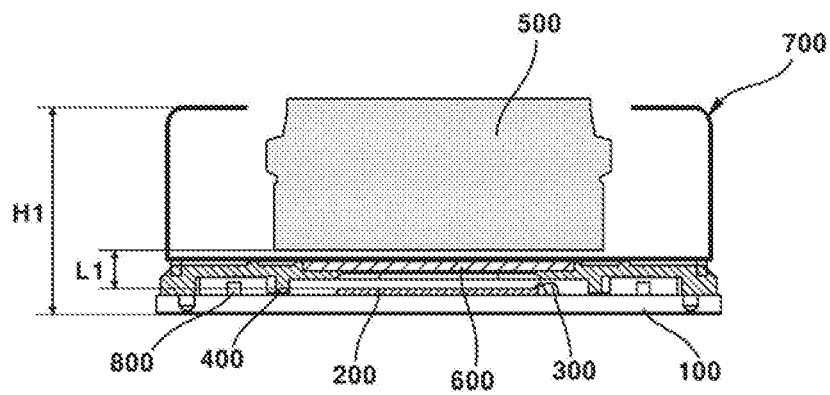
FIG. 7 is a cross-sectional view illustrating a camera module according to (a) a comparative example and (b) an exemplary embodiment of the present disclosure in order to explain an effect of a first exemplary embodiment of the present disclosure.
Figure 7:
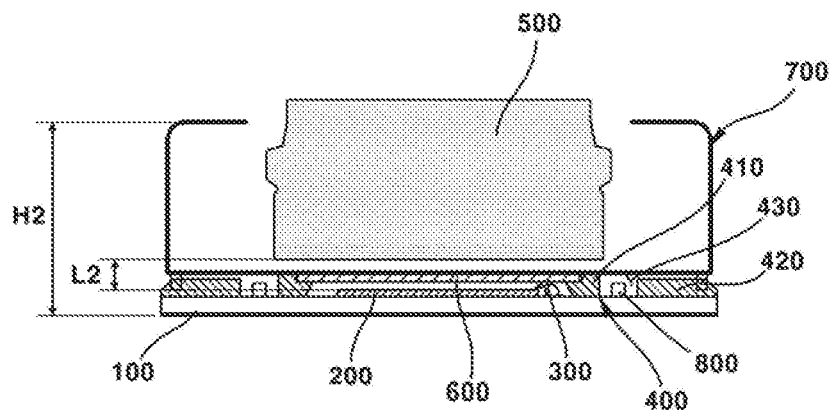

The below-used "FBL" is an abbreviation of Flange Back Length, and means a distance from an upper surface of an image sensor to a bottom surface of the lens module. FBL is illustrated in FIG. 7 as L1 and L2.

Hereinafter, one of an AF coil part (7220), a driving magnet part (7320) and an OIS coil part (7410) may be referred to as a "first driving part", and another one may be referred to as a "second driving part", and a remaining one may be referred to as a "third driving part".

Now, a configuration of an optical apparatus according to a first exemplary embodiment of the present disclosure will be described.

An optical apparatus may include a mobile phone, a smart phone, a mobile smart device, a digital camera, a notebook computer (laptop computer), a digital broadcasting terminal, a PDA (Personal Digital Assistant), a PMP (Portable Multimedia Player), and a navigation device. The present disclosure is not limited thereto, and any device for photographing an image or a still photo may be used for an optical apparatus.

The optical apparatus may include a main body (not shown), a camera module and a display part (not shown). However, it may be possible to delete or change more than any one of the main body, camera module and display part from the optical apparatus.

The main body may form an external look of the optical apparatus. For example, the main body may take a shape of a rectangular parallelepiped. For another example, the main body of a rectangular parallelepiped shape may be formed in at least one part with a rounded corner. The main body may accommodate a camera module. One surface of the main body may be arranged with a display part. For example, one surface of the main body may be arranged with a display part and a camera module, while the other surface (a surface opposite to the one surface) of the main body may be additionally arranged with a camera module.

The camera module may be arranged at the main body. The camera module may be arranged at one surface of the main body. At least a part of the camera module may be accommodated in the main body. The camera module may be formed in a plural number. The plurality of camera modules may be respectively arranged at one surface of the main body and the other surface of the main body. The camera module can photograph an image of a subject.

The display part may be arranged at the main body. The display part may be arranged at one surface of the main body. That is, the display part may be arranged at a same surface as that of the camera module. Alternatively, the display part may be arranged at the other surface of the main body. The display part may be arranged at a surface positioned opposite to a surface arranged with the camera module. The display part may output an image photographed by the camera module.

Now, configuration of a camera module according to a first exemplary embodiment of the present disclosure may be described with reference to the accompanying drawings.

Figure 2:
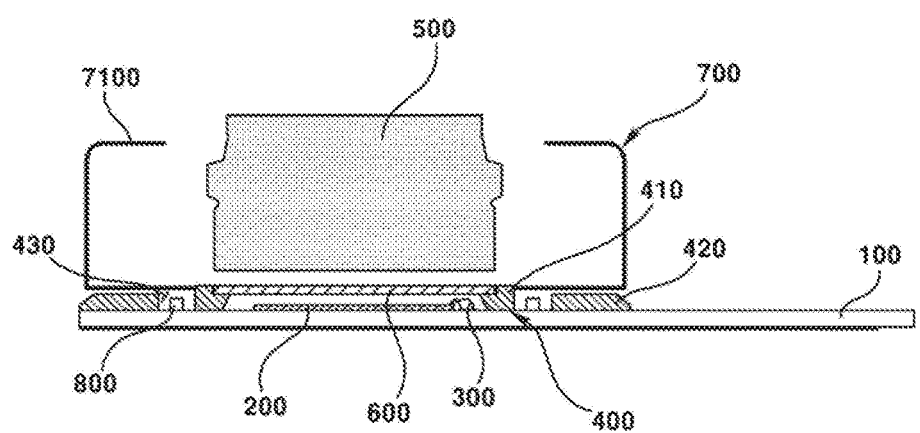
FIG. 2 is a cross-sectional view taken along line A-A of FIG. 1.
Figure 3:
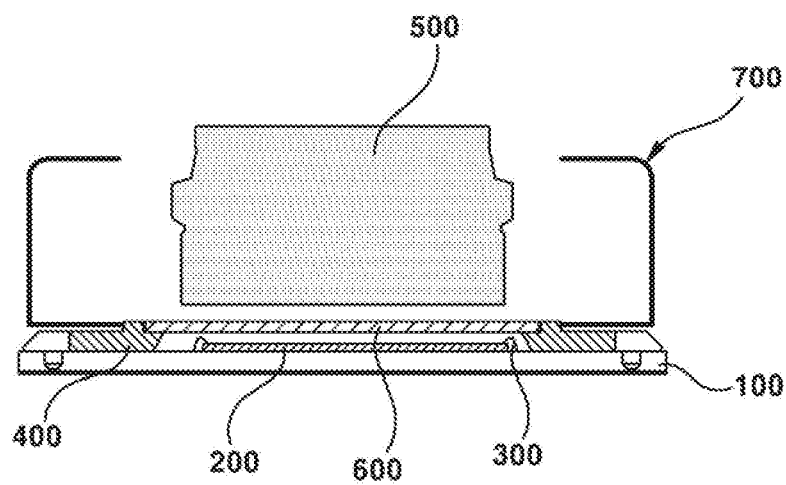
FIG. 3 is a cross-sectional view taken along line B-B of FIG. 1.
Figure 4:
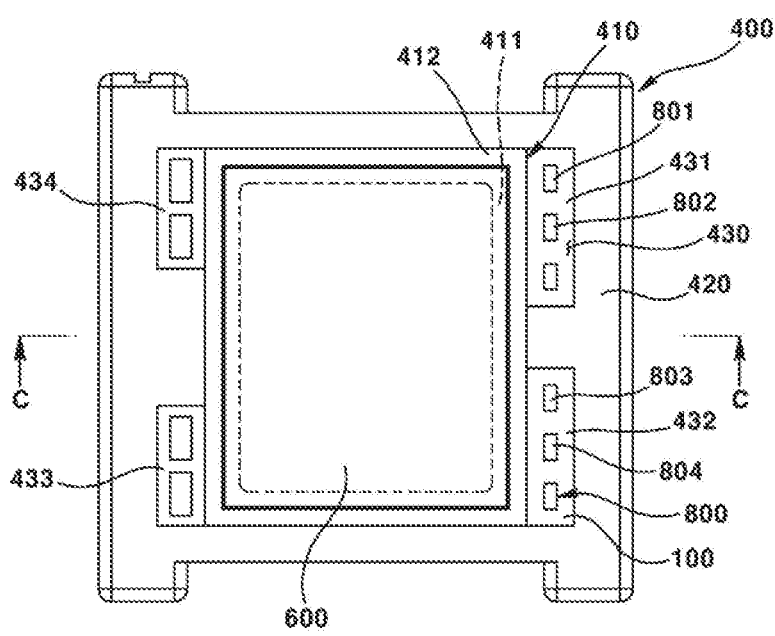
FIG. 4 is a plane view illustrating a partial configuration of a camera module according to a first exemplary embodiment of the present disclosure.
Figure 5:
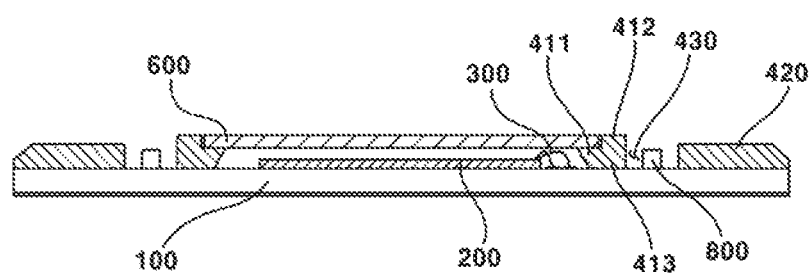
FIG. 5 is a cross-sectional view taken along line C-C of FIG. 4.
Figure 6:
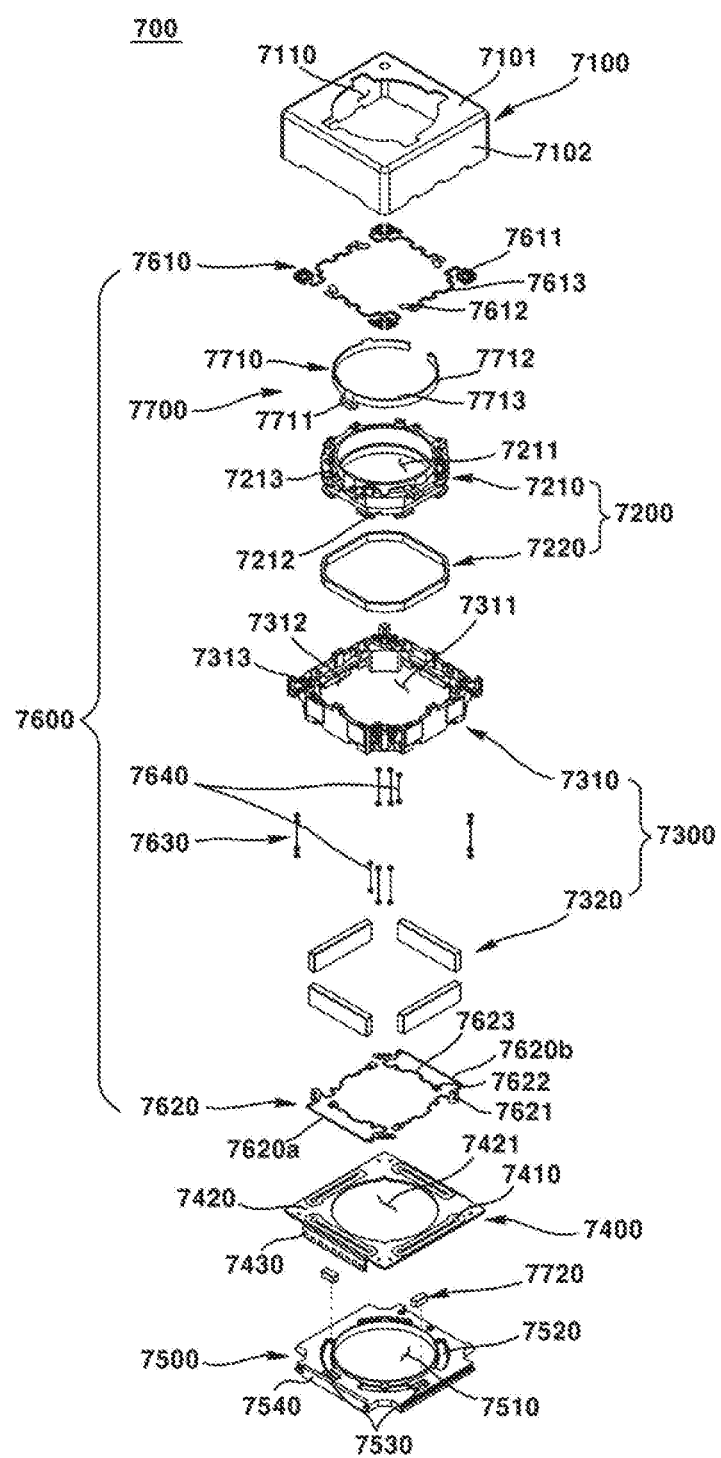
FIG. 6 is an exploded perspective view of a lens driving unit according to a first exemplary embodiment of the present disclosure.

FIG. 1 is a plane view illustrating a camera module according to a first exemplary embodiment of the present disclosure, FIG. 2 is a cross-sectional view taken along line A-A of FIG. 1, FIG. 3 is a cross-sectional view taken along line B-B of FIG. 1, FIG. 4 is a plane view illustrating a partial configuration of a camera module according to a first exemplary embodiment of the present disclosure, FIG. 5 is a cross-sectional view taken along line C-C of FIG. 4, and FIG. 6 is an exploded perspective view of a lens driving unit according to a first exemplary embodiment of the present disclosure.

The camera module may include a circuit board (100), an image sensor (200), a current carrying part (300), a first base (400), a lens module (500), a filter (600), a lens driving unit (700) and a circuit element unit (800). However, any one or more of the circuit board (100), the image sensor (200), the current carrying part (300), the first base (400), the lens module (500), the filter (600), the lens driving unit (700) and the circuit element unit (800) may be omitted.

The circuit board (100) may be disposed at an upper surface with an image sensor (200). The circuit board (100) may be electrically conducted to the image sensor (200) through a current carrying part (300). The circuit board (100) may be disposed at an upper surface with a first base (400). The circuit board (100) may be disposed at an inner side of the upper surface with the image sensor (200), and may be disposed at an outside with the first base (400). The circuit board (100) may be disposed at an upper surface with a third support unit (413) of the first base (400). The circuit board (100) may be contacted at an upper surface by a bottom surface of a first support unit (411) of the first base (400). The circuit board (100) may supply an electric power to first to third driving units (not shown). The circuit board (100) may be disposed with a controller in order to control the first to third driving units.

The image sensor (200) may be disposed at an upper surface of the circuit board (100). The image sensor (200) may be electrically connected to the circuit board (100) through the current carrying part (300). The image sensor (200) may be prevented from being overlapped with the first base (400) in the optical axis direction. The image sensor (200) may be disposed at an upper side with a lens module (500). The filter (600) may be interposed between the image sensor (200) and the lens module (500). The image sensor (200) may be spaced apart from the filter (600). The image sensor (200) may be disposed at an outside with a current carrying part (300).

The image sensor (200) may be mounted on the circuit board (100). The image sensor (200) may be accommodated at an inside of the first base (400). The image sensor (200) may be so disposed as to conform to the lens module (500) in terms of optical axis, whereby the image sensor (200) can obtain a light having passed the lens module (500). The image sensor (200) may output the obtained light in an image. The image sensor (200) may include any one or more than any one of a CCD (Charged Coupled Device), a MOS (Metal Oxide Semi-Conductor), a CPD and a CID. However, the present disclosure is not limited thereto.

The current carrying part (300) may electrically connect the image sensor (200) and the circuit board (100). The current carrying part (300) may be prevented from being overlapped with the first base (400) in the optical axis direction. The current carrying part (300) may be spaced apart from the filter (600). The current carrying part (300) may include a wire loop disposed at an outside of the image sensor (200). The first base (400) may be disposed at an outside of the wire loop. That is, the first base (400) may be escaped to an outside of the wire loop.

The first base (400) may be disposed at an upper surface of the circuit board (100). The lens driving unit (700) may be disposed at an upper side of the first base (400). A cover member (7100) may be disposed at an upper side of the first base (400). The first base (400) may be disposed with an OIS coil part (7410). Meantime, any one of the first base (400) and a second base (7500) of the lens driving unit (700) may be omitted. Furthermore, the first base (400) and the second base (7500) of the lens driving unit (700) may be integrally formed.

The first base (400) may not be overlapped with the image sensor (200) in the optical axis direction. The first base (400) may not be overlapped with the current carrying part (300) in the optical axis direction. Through this structure (thus described) of the first exemplary embodiment of the present disclosure, a FBL (Flange Back Length) which is a distance from an upper surface of the image sensor (200) to a bottom surface of the lens module (500) can be minimized. Furthermore, a whole length of a camera module can be minimized by the minimized FBL according to the first exemplary embodiment of the present disclosure.

The first base (400) may not be overlapped with the circuit element unit (800) in the optical axis direction. That is, an upper side of the circuit element unit (800) may be opened. A position of a bottom end of the lens driving unit (700) can be reduced through this structure, whereby a whole length of a camera module can be also minimized.

The first base (400) may include a filter support part (410) supporting the filter (600). The first base (400) may include a cover member support part (420) supporting a cover member (7100). Furthermore, the first base (400) may be formed with an element accommodation part (430) disposed at a position between the filter support part (410) and the cover member support part (420) to accommodate the circuit element unit (800). The first base (400) may be formed with the element accommodation part (430) to accommodate the circuit element unit (800) and to pass through the first base (400) in an optical axis direction.

The filter support part (410) may be spaced (distanced) apart from at least a part of the cover member support part (420). The filter support part (410) may be formed with an element accommodation part (430) at a discrete space between the filter support part (410) and the cover member support part (420). The filter support part (410) may include a first support unit (411) supporting a part of a bottom surface of the filter (600). The filter support part (410) may include a second support unit (412) opposite to a lateral surface of the filter (600). The filter support part (410) may include a third support unit (413) disposed at an upper surface of the circuit board (100) to connect the first and second support units (411, 412).

The first support unit (411) may support a part of a bottom surface of the filter (600). A bottom surface of the first support unit (411) may contact an upper surface of the circuit board (100). That is, the first support unit (411) may be directly supported by the circuit board (100). A width of the first support unit (411) to a direction (horizontal direction) perpendicular to an optical axis direction may be enlarged toward an upper side from a bottom end of the first support unit (411). That is, the first support unit (411) may be extended from an upper surface of the circuit board (100) to a bottom surface of the filter (600) in order to have a slope.

The second support unit (412) may face a later surface of the filter (600). A height of the second support unit (412) in on optical axis direction may correspond to a height of the filter (600) in an optical axis direction. That is, the second support unit (412) may not be protruded over the filter (600) toward an upper side.

The third support unit (413) may connect the first and second support units (411, 412). The third support unit (413) may be disposed at an upper surface of the circuit board (100). The first to third support units (411, 412, 413) may be integrally formed.

The cover member support part (420) may be disposed between the cover member (7100) and the circuit board (100). A bottom surface of the cover member support part (420) may be positioned with a bottom end of the cover member (7100).

A length of the cover member support part (420) in the optical axis direction may correspond to a length of the first support unit (411) in the optical axis direction. The length of the cover member support part (420) in the optical axis direction may be smaller than a length of the filter support part (410) in the optical axis direction. That is, the height of the cover member support part (420) may be lower than that of the filter support part (410). Thus, a position of a bottom end surface of the lens driving unit (700) supported at a bottom end surface by the cover member support part (420) may be reduced, whereby a whole length of a camera module can be minimized.

The element accommodation part (430) may be formed by omitting a part of the first base (400). The element accommodation part (430) may be interposed between the filter support part (410) and the cover member support part (420). The element accommodation part (430) may be opened at an upper surface. That is, the circuit element unit (800) accommodated into the element accommodation part (430) may be opened toward an upper side. The element accommodation part (430) may accommodate the circuit element unit (800). The element accommodation part (430) may pass through the base (400) in the optical axis direction.

The element accommodation part (430) may include a plurality of accommodation parts. The element accommodation part (430) may include first to fourth accommodation parts (431, 432, 433, 434), each mutually spaced apart from the other part. However, the number of accommodation parts forming the element accommodation part (430) is not limited to four (431, 432, 433, 434).

The element accommodation part (430) may include a first accommodation part (431) disposed at one side of the image sensor (200). The element accommodation part (430) may include, at one side of the image sensor (200), a second accommodation part (432) disposed by being spaced apart from the first accommodation part (431). The element accommodation part (430) may include a third accommodation part (433) disposed at the other side of the image sensor (200). That is, the third accommodation part (433) may be disposed at a position opposite to the first accommodation part (431). The element accommodation part (430) may include a fourth accommodation part (434) disposed at the other side of the image sensor (200) by being spaced apart from the third accommodation part (433).

The first and second accommodation parts (431, 432) may be disposed at one side of the image sensor (200). The third and fourth accommodation parts (433, 434) may be disposed at the other side of the image sensor (200). The first and second accommodation parts (431, 432) may be spaced apart by the first base (400). The third and fourth accommodation parts (433, 434) may be spaced apart by the first base (400).

Each of the first to fourth accommodation parts (431, 432, 433, 434) may accommodate at least one circuit element. The first accommodation part (431) may accommodate first and second circuit elements (801, 802). Furthermore, the first accommodation part (431) may accommodate three or more circuit elements.

The second accommodation part (432) may accommodate third and fourth circuit elements (803, 804). Furthermore, the second accommodation part (432) may accommodate three or more circuit elements. The third and fourth accommodation parts (433, 434) may be also applied with the description of the first and second accommodation parts (431, 432).

The lens module (500) may be disposed at an upper side of the image sensor (200). The filter (600) may be interposed between the lens module (500) and the image sensor (200). The lens module (500) may be disposed at an inside of the cover member (7100). The lens module (500) may be fixed to the first base (400).

The lens module (500) may include at least one lens (not shown). The lens module (500) may include a lens and a lens barrel. The lens module (500) may include at least one lens and a lens barrel accommodating at least one lens. However, the configuration of the lens module (500) is not limited to a lens barrel, and any configuration of holder structure supportable of at least one lens may be allowable. The lens module (500) may be screw-connected to a bobbin (not shown). Alternatively, the lens module (500) may be coupled to a bobbin (not shown) using an adhesive. A light having passed the lens module (500) may be irradiated on an image sensor (200).

The filter (600) may be disposed between the lens module (500) and the image sensor (200). The filter (600) may be supported at a part of a bottom surface thereof by the first support unit (411). A lateral surface of the filter (600) may face a second support unit (412). A height of the filter (600) may correspond to a height of the second support unit (412). The filter (600) may be spaced apart from the image sensor (200). The filter (600) may be spaced apart from the current carrying part (300).

The filter (600) may prevent a light of IR (Infrared) region from being incident on the image sensor (200). The filter (600) may include an IR absorption filter (blue filter). The filter (600) may include an IR reflection filter (IR cut filter). The filter (600) may be formed with a film material or a glass material. The filter (600) may be formed by coating an IR cut-off coating material on an optical filter of flat type such as imaging surface protection cover glass or a cover glass. However, the present disclosure is not limited thereto.

The lens driving unit (700) may include a cover member (7100), a first rotor (7200), a second rotor (7300), a stator (7400), a second base (7500), a support member (7600) and a sensor part (7700). However, the lens driving unit (700) according to a first exemplary embodiment of the present disclosure may omit one or more elements from the cover member (7100), the first rotor (7200), the second rotor (7300), the stator (7400), the second base (7500), the support member (7600) and the sensor part (7700). Particularly, the sensor part (7700) may be omitted from configuration of the lens driving unit (700), because the sensor part (7700) is a configuration for auto focus feedback function and/or handshake correction feedback function.

The cover member (7100) may form an external shape of the lens driving unit (700). The cover member (7100) may take a shape of a hexahedron opened at a bottom surface. However, the present disclosure is not limited thereto. The cover member (7100) may include an upper plate (7101) and a lateral plate (7102) extended from an outside of the upper plate (7101) to a bottom side. Meantime, a bottom end of the lateral plate (7102) of the cover member (7100) may be mounted on the second base (7500). An inner space formed by the cover member (7100) and the second base (7500) may be disposed with a first rotor (7200), a second rotor (7300), a stator (7400) and a support member (7600). Furthermore, the cover member (7100) may be mounted on the second base (7500) by being tightly contacted at an inner lateral surface to a part or a whole area of lateral surface of the second base (7500). The cover member (7100) can perform the functions of protecting an inner constituent elements and preventing foreign objects from penetrating to an inside.

The cover member (7100) may be formed with a metal material, for example. To be more specific, the cover member (7100) may be formed with a metal plate. In this case, the cover member (7100) can block electric wave interference. That is, the cover member (7100) can block the electric wave generated from outside of the lens driving unit (700) from entering an inside of the cover member (7100). Furthermore, the cover member (7100) can block the electric wave generated from inside of the cover member (7100) from emitting to the outside of the cover member (7100). However, the material of cover member (7100) is not limited to the metal material, or metal plate.

The cover member (7100) may include an opening (7110) formed at an upper plate (7101) to expose the lens module (500). The opening (7110) may be formed in a shape corresponding to that of the lens module (500). The size of the opening (7110) may be formed greater than a diameter of the lens module (500) to allow the lens module (500) to be assembled through the opening (7110). Furthermore, a light introduced through the opening (7110) may pass through the lens module (500). Meantime, the light having passed the lens module (500) may be transmitted to the image sensor.

The first rotor (7200) may be coupled with the lens module (500). The lens module (500) may be disposed at an inside of the first rotor (7200). An inner surface of the first rotor (7200) may be coupled with an external circumferential surface of the lens module (500). Meantime, the first rotor (7200) may integrally move with the lens module (500) through an interaction with a second rotor (7300). That is, the first rotor (7200) can move the lens module (500).

The first rotor (7200) may include a bobbin (7210) and an AF coil part (7220). The first rotor (7200) may include a bobbin (7210) that is coupled with the lens module (500). The first rotor (7200) may include an AF coil part (7220) disposed at the bobbin (7210) to be moved by electromagnetic interaction with a driving magnet part (7320).

The bobbin (7210) may be coupled with the lens module (500). To be more specific, the bobbin (7210) may be coupled at an inner circumferential surface by the external circumferential surface of the lens module (500). Meantime, the bobbin (7210) may be coupled with the AF coil part (7220). Furthermore, the bobbin (7210) may be coupled at a bottom surface with a bottom support member (7620) and may be coupled at an upper surface with an upper support member (7610). The bobbin (7210) may be disposed at an inside of a housing (7310). The bobbin (7210) may relatively move to an optical axis direction relative to the housing (7310).

The bobbin (7210) may include a lens coupling part (7211) formed at an inside thereof. The lens coupling part (7211) may be coupled by the lens module (500). An inner circumferential surface of the lens coupling part (7211) may be formed with a screw thread having a shape corresponding to that of a screw thread formed at the external circumferential surface of the lens module (500). That is, an inner circumferential surface of the lens coupling part (7211) may be screw-connected by the external circumferential surface of the lens module (500). Meantime, an adhesive may be injected between the lens module (500) and the bobbin (7210). At this time, the adhesive may be an epoxy that is cured (hardened) by UV (Ultraviolet). That is, the lens module (500) and the bobbin (7210) may be adhered by UV-curing epoxy. Alternatively, the lens module (500) and the bobbin (7210) may be adhered by heat-curing epoxy.

The bobbin (7210) may include a first driving part coupling part (7212) wound or mounted with an AF coil part (7220). The first driving part coupling part (7212) may be integrally formed with an external lateral surface of the bobbin (7210). Furthermore, the first driving part coupling part (7212) may be continuously formed along the external lateral surface of the bobbin (7210) or formed by being spaced apart at a predetermined distance. The first driving part coupling part (7212) may include an indent part formed by a part of the external lateral surface of the bobbin (7210) being caved in. The indent part may be disposed with an AF coil part (7220), where the AF coil part (7220) may be supported by the first driving part coupling part (7212).

By way of example, the first driving part coupling part (7212) may be formed by parts protruded at upper and bottom sides of the indent part being disposed, where a coil of the first driving part (7300) may be directly wound on the indent part of the first driving part coupling part (7212). Alternatively, by way of another example, the first driving part coupling part (7212) may take a shape of upper side or a bottom side of the indent part being opened, and formed at the other side by being disposed with a hitching part, where the coil of the first driving part (7300) may be coupled by being inserted through the opened part while the coil is in a pre-wound state.

The bobbin (7210) may include an upper coupling part (7213) coupled to an upper support member (7610). The upper coupling part (7213) may be coupled to an inner lateral part (7612) of the upper support member (7610). For example, a lug (not shown) of the upper coupling part (7213) may be coupled by being inserted into a groove or a hole of the inner lateral part (7612).

The bobbin (7210) may include a bottom coupling part (not shown) coupled to a bottom support member (7620). The bottom coupling part formed at a bottom surface of the bobbin (7210) may be coupled with an inner lateral part (7622) of the bottom support member (7620). For example, a lug (not shown) of the bottom coupling part may be coupled by being inserted into a groove or a hole of the inner lateral part (7622).

The AF coil part (7220) may be disposed by facing or being opposite to a driving magnet part (7320) of a second rotor (7300). The AF coil part (7220) may move the bobbin (7210) through an electromagnetic interaction with the driving magnet part (7320) relative to the housing (7310). The AF coil part (7220) may include a coil. The coil may be guided by the first driving part coupling part (7212) to be wound on the external lateral surface of the bobbin (7210). Furthermore, by way of another example, the AF coil part (7220) may be arranged at the external lateral surface of the bobbin (7210) to allow four independent coils to be disposed and to allow two adjacent coils to form an angle of 90° therebetween.

The AF coil part (7220) may receive an electric power through the bottom support member (7620). At this time, the bottom support member (7620) may be divisably formed in a pair in order to supply the electric power to the AF coil part (7220). Meantime, the AF coil part (7220) may include a pair of leader lines (not shown) in order to supply the electric power to the AF coil part (7220). In this case, each of the pair of leader lines on the AF coil part (7220) may be electrically coupled to a pair of bottom support members (7620a, 7620b). Alternatively, the AF coil part (7220) may receive the electric power from the upper support member (7610).

Meantime, the AF coil part (7220) may be formed at a surrounding with an electromagnetic field when the power is supplied to the AF coil part (7220). By way of another example, the AF coil part (7220) and the driving magnet part (7320) may be so arranged as to exchange their positions.

The second rotor (7300) may be disposed opposite to the first rotor (7200) at an external side of the first rotor (7200). The second rotor (7300) may be supported by a second base (7500) disposed at a bottom surface thereof. The second rotor (7300) may be supported by a fixed member. At this time, the fixed member may include the second base (7500) and a stator (7400). That is, the second rotor (7300) may be supported by the second base (7500) and/or the stator (7400). The second rotor (7300) may be disposed at an inner space of the cover member (7100).

The second rotor (7300) may include a housing (7310) and a driving magnet part (7320). The second rotor (7300) may include a housing (7310) disposed at an outside of the bobbin (7210). Furthermore, the second rotor (7300) may be disposed opposite to the AF coil part (7220) to include a driving magnet part (7320) fixed to the housing (7310).

At least one part of the housing (7310) may be formed with a shape corresponding to that of an inner lateral surface of the cover member (7100).

Inter alia, an external lateral surface of the housing (7310) may be formed with a shape corresponding to an inner lateral surface of a lateral plate (7102) of the cover member (7100). The external lateral surface of the housing (7310) and the inner lateral surface of the lateral plate (7102) may be flatly formed. To be more specific, when the housing is at an initial position, the external lateral surface of the housing (7310) and the inner lateral surface of the lateral plate (7102) may be flatly formed.

In this case, when the housing (7310) is moved maximally to a cover member (7100) side, the external lateral surface of the housing (7310) and the inner lateral surface of the lateral plate (7102) may surface-contact to disperse a shock generated from the housing (7310) and/or the cover member (7100). The housing (7310) may take a shape of a hexahedron including four lateral surfaces, for example. However, the shape of the housing (7310) may take any shape as long as the housing is arranged inside the cover member (7100). The housing (7100) may be coupled at an upper surface with the upper support member (7610), and may be coupled at a bottom surface with the bottom support member (7620).

The housing (7310) may be formed with an insulating material, and may be formed with an injection-molded material in consideration of productivity. The housing (7310) is a moving part for ON driving, and may be spaced apart from the cover member (7100) at a predetermine distance. However, in case of AF model, the housing (7310) may be fixed on the second base (7500). Furthermore, the housing (7310) may be omitted in case of the AF model, and the driving magnet part (7320) may be fixed on the cover member (7100).

The housing (7310) may be opened at an upper side and a bottom side to movably accommodate the first rotor (7200) to a vertical direction. The housing (7310) may include an upper/bottom opened inner space (7311) at an inside of the housing (7310). The inner space (7311) may be movably disposed therein with a bobbin (7210). That is, the inner space (7311) may take a shape corresponding to that of the bobbin (7210). Furthermore, an inner circumferential surface of the housing (7310) forming the inner space (7311) may be spaced apart from the external circumferential surface of the bobbin (7210). The housing (7310) may be movably supported relative to the second base (7500). That is, the housing (7310) may be moved or tilted to a horizontal direction based on second base (7500).

The housing (7310) may include a second driving part coupling part (7312) formed at a lateral surface with a shape corresponding to that of the driving magnet part (7320) to accommodate the driving magnet part (7320). That is, the second driving part coupling part (7312) may be fixed by accommodating the driving magnet part (7320). The driving magnet part (7320) may be fixed to the second driving part coupling part (7312) by an adhesive (not shown). Meantime, the second driving part coupling part (7312) may be disposed at an inner lateral part of housing (7310), which is advantageous to the electromagnetic interaction with the AF coil part (7220) disposed at an inside of the driving magnet part (7320). Furthermore, the second driving part coupling part (7312) may be opened at a bottom surface, for example, which is advantageous to the electromagnetic interaction between a substrate (7420) disposed at a bottom side of the driving magnet part (7320) and the driving magnet part (7320). By way of example, a bottom end of the driving magnet part (7320) may be so disposed as to allow more protruding downward than a bottom end of the housing (7310). The second driving part coupling part (7312) may be formed in the number of four (4), for example. Each of the second driving part coupling part (7312) may be coupled by the driving magnet part (7320).

The housing (7310) may include an upper coupling part (7313) coupled with the upper support member (7610). The upper coupling part (7313) may be coupled to an external lateral part (7611) of the upper support member (7610). By way of example, a lug of the upper coupling part (7313) may be coupled by being inserted into a groove or a hole (not shown) of the external lateral part (7611).

The housing (7310) may include a bottom coupling part (not shown) coupled to the bottom support member (7620). The bottom coupling part formed at a bottom surface of the housing (7310) may be coupled to an external lateral part (7621) of the bottom support member (7620). By way of example, a lug of the bottom coupling part may be coupled by being inserted into a groove or a hole (not shown) of the external lateral part (7621).

The housing (7310) may include a first lateral surface, a second lateral surface adjacent to the first lateral surface and a corner part disposed between the first and second lateral surfaces. The corner part of the housing (7310) may be disposed with an upper stopper (not shown). The upper stopper may be overlapped with the cover member (7100) to a vertical direction. When the housing (7310) is moved upward by an external shock, the upper stopper may restrict an upward movement of the housing by being contacted to the cover member (7100).

The driving magnet part (7320) may be disposed opposite to the AF coil part (7220) of the first rotor (7200). The driving magnet part (7320) may move the AF coil part (7220) through the electromagnetic interaction with the AF coil part (7220). The driving magnet part (7320) may include a magnet. The magnet may be fixed to the second driving part coupling part (7312). The driving magnet part (7320) may be arranged at the housing (7310) to allow four independent magnets to be disposed and to allow two adjacent magnets to form an angle of 90° therebetween, as illustrated in FIG. 2.

That is, the driving magnet part (7320) may be mounted at four lateral surfaces of the housing (7310) each at an equidistance, to promote an efficient use of an inner volume. Furthermore, the driving magnet part (7320) may be adhered to the housing (7310) using an adhesive, but the present disclosure is not limited thereto.

The stator (7400) may be disposed at the second base (7500). The stator (7400) may be disposed opposite to a bottom side of the second rotor (7300). The stator (7400) may movably support the second rotor (7300). The stator (7400) may move the second rotor (7300). The stator (7400) may be disposed at a center with a through hole (7421) corresponding to the lens module (500). Because the stator (7400) may be formed with a terminal part (7430) to directly communicate with the outside according to the first exemplary embodiment of the present disclosure, there is required no separate FPCB. Thus, the first exemplary embodiment of the present disclosure may expect a cost reduction effect because the number of parts, the number of procedures and a reduced process management point over a model that is separately mounted with an FPCB and a pattern coil. Furthermore, the entire height of the product is reduced to contribute to the miniaturization of the product.

The stator (7400) may include an OIS coil part (7410) and a substrate (7420), for example. The stator (7400) may include an OIS coil part (7410) arranged at the substrate (7420). The stator (7400) may include a substrate (7420) accommodated at the second base (7500) by being disposed opposite to a bottom side of the driving magnet part (7320). The stator (7400) may include a terminal part (7430) extended by being bent from the substrate (7420) to a bottom side.

The OIS coil part (7410) may face the driving magnet part (7320). The OIS driving coil part (7410) may move the driving magnet part (7320) through an electromagnetic interaction. When a power is applied to the OIS coil part (7410), the driving magnet part (7320) and the housing (7310) fixed by the driving magnet part (7320) may integrally move through an electromagnetic interaction with the driving magnet part (7320). The OIS coil part (7410) may be mounted on the substrate (7420), electrically connected to the substrate (7420) or integrally formed with the substrate (7420). The OIS coil part (7410) may be an FP (Fine Pattern) coil, for example, and may be arranged, mounted or formed at the substrate (7420). The OIS coil part (7410) may be so formed as to minimize an interference with an OIS sensor (7720) disposed at a bottom side, for example. The OIS coil part (7410) may be so formed as not to overlap with the OIS sensor (7720) to a vertical direction. The ON sensor (7720) may be so mounted at a bottom side of the stator (7400) as to prevent overlap with the OIS coil part (7410) to a vertical direction. The OIS coil part (7410) may be arranged by being changed in position with the driving magnet part (7320).

The substrate (7420) may be accommodated on the second base (7500). Meantime, the substrate (7420) can supply an electric power to the AF coil part (7220). By way of example, the substrate (7420) can supply the power to the AF coil part (7220) through a lateral support member (7630), an upper support member (7610), a current carrying member (7640) and a bottom support member (7620). Alternatively, the substrate (7420) can supply the power to the AF coil part (7220) through the lateral support member (7630) and the upper support member (7610).

The substrate (7420) may support from a bottom side in order to move or tilt the housing (7310) to a horizontal direction. The substrate (7420) may be coupled with the housing (7310) through the lateral support member (7630). The substrate (7420) may be disposed with an OIS sensor (7720) detecting a position or movement of the housing (7310). The substrate (7420) may be disposed at an upper surface with the OIS coil part (7410), and may be disposed at a bottom surface with the OIS sensor (7720).

The substrate (7420) may include a through hole (7421). The substrate (7420) may include a through hole (7421) allowing a light having passed the lens module (500) to pass therethrough. The through hole (7421) may be formed at a center of the substrate (7420). The through hole (7421) may be formed with a round shape, but the present disclosure is not limited thereto.

The terminal part (7430) may be connected to an outside electric power source through which the substrate (7420) is supplied with the power. The terminal part (7430) may be formed by being extended from a lateral side of the substrate (7420). The terminal part (7430) may be disposed at both sides of the substrate (7420). The substrate (7420) and the terminal part (7430) may be integrally formed. The terminal part (7430) may be accommodated in to a terminal accommodation part (7540) formed by a part of a lateral surface of the second base (7500) being caved in. The terminal accommodation part (7540) may be formed with a width corresponding to that of the terminal part (7430).

The second base (7500) may support the second rotor (7300). The second base (7500) may be disposed at a bottom side with the first base (400). Meantime, any one of the first and second bases (400, 7500) may be omitted, and the first and second bases (400, 7500) may be integrally formed. The second base (7500) may include a through hole (7510) formed at a position corresponding to that of the lens coupling part (7211) of the bobbin (7210). The second base (7500) may include a foreign object collection part (7520) collecting foreign objects introduced into the cover member (7100), for example. The foreign object collection part (7520) may be disposed at a position at an upper surface of the second base (7500) to collect foreign objects including an adhesive material and a foreign object at an inside space formed by the cover member (7100) and the second base (7500).

The second base (7500) may include a sensor part accommodation groove (7530) coupled by the OIS sensor (7720). That is, the OIS sensor (7720) may be mounted on the sensor part accommodation groove (7530). At this time, the OIS sensor (7720) may detect a horizontal movement or tilt of the housing (7310) by detecting the driving magnet part (7320) coupled to the housing (7310). The sensor part accommodation groove (7530) may be formed in the number of two (2), for example. Each of the sensor part accommodation groove (7530) may be disposed with the OIS sensor (7720). In this case, the OIS sensor (7720) may be so arranged as to detect both x axis direction movement and y axis direction movement of the housing (7310). That is, an imaginary line connecting each of the two OIS sensors (7720) and the optical axis may cross at a right angle.

The support member (7600) may connect two or more of the first rotor (7200), the second rotor (7300), the stator (7400) and the second base (7500). The support member (7600) may elastically connect two or more of the first rotor (7200), the second rotor (7300), the stator (7400) and the second base (7500) to enable a relative movement between each element. The support member (7600) may be formed with an elastic member. The support member (7600) may include an upper support member (7610), a bottom support member (7620), a lateral support member (7630) and a current carrying member (7640), for example. However, the current carrying member (7640) is disposed to carry a current for the upper support member (7610) and the bottom support member (7620), such that the current carrying member (7640) may be explained by being separated from the upper support member (7610), the bottom support member (7620), and the lateral support member (7630).

The upper support member (7610) may include an external part (7611), an internal part (7612) and a connection part (7613), for example. The upper support member (7610) may include an external part (7611) coupled to the housing (7310), an internal part (7612) coupled to the bobbin (7210) and a connection part (7613) elastically connecting the external part (7611) and the internal part (7612).

The upper support member (7610) may be connected to an upper surface of the first rotor (7200) and an upper surface of the second rotor (7300). To be more specific, the upper support member (7610) may be coupled to an upper surface of the bobbin (7210) and to an upper surface of the housing (7310). The internal part (7612) of the upper support member (7610) may be coupled to an upper lateral coupling part (7213) of the bobbin (7210), and the external part (7611) of the upper support member (7610) may be coupled to an upper lateral coupling part (7313) of the housing (7310).

The upper support member (7610) may be divisibly formed with six (6) upper current carrying parts, for example. At this time, the two (2) upper current carrying parts in the six current carrying parts may be electrically connected to be used for applying an electric power to the AF coil part (7220). Each of the two upper current carrying parts may be electrically connected to each of a pair of bottom support members (7620*a*, 620*b*) through a current carrying member (7640). The remaining four (4) upper current carrying parts of the six upper current carrying parts may be electrically connected to the AF sensor part (7710) disposed at the bobbin (7210). The remaining four (4) upper current carrying parts may supply an electric power to the AF sensor part (7710) and may be used for receipt and transmission of information and signals between a controller and the AF sensor part (7710). Furthermore, as a modification, the two upper current carrying parts of the six upper current carrying parts may be directly connected to the AF coil part (7220) and the remaining four upper current carrying parts may be connected to the AF sensor part (7710).

The bottom support member (7620) may include a pair of bottom support members (7620*a*, 620*b*), for example. That is, the bottom support member (7620) may include a first bottom support member (7620*a*) and a second bottom support member (7620*b*). At this time, the bottom support member (7620) may be explained as including two bottom current carrying parts. Each of the first bottom support member (7620*a*) and the second bottom support member (7620*b*) can supply an electric power by being connected to each of a pair of leader lines on the AF coil part (7220) formed by a coil. Meantime, the pair of bottom support members (7620*a*, 620*b*) may be electrically connected to the OIS coil part (7410). Through this type of structure, the pair of bottom support members (7620) can provide the electric power supplied from the OIS coil part (7410) to the AF coil part (7220).

The bottom support member (7620) may include an external part (7621), an internal part (7622) and a connection part (7623). The bottom support member (7620) may include an external part (7621) coupled to the housing (7310), an internal part (7622) coupled to the bobbin (7210) and a connection part (7623) elastically connecting the external part (7621) and the internal part (7622).

The bottom support member (7620) may be connected to a bottom surface of the first rotor (7200) and to a bottom surface of the second rotor (7300). To be more specific, the bottom support member (7620) may be connected to a bottom surface of the bobbin (7210) and to a bottom surface of the housing (7310). The internal part (7622) of the bottom support member (7620) may be coupled with a bottom coupling part of the bobbin (7210), and the external part (7621) of the bottom support member (7620) may be coupled with a bottom coupling part of the housing (7310).

The lateral support member (7630) may be coupled at one side to the stator (7400) and/or to the second base (7500), and may be coupled at the other side to the upper support member (7610) and/or to the second rotor (7300). The lateral support member (7630) may be coupled at one side to the stator (7400) and may be coupled at the other side to the housing (7310), for example. Furthermore, by way of another example, the lateral support member (7630) may be coupled at one side to the second base (7500) and may be coupled at the other side to the upper support member (7610). As noted above, the lateral support member (7630) may elastically support the second rotor (7300) to allow the second rotor (7300) to horizontally move or tilt relative to the second base (7500).

The lateral support member (7630) may include a plurality of wires. Furthermore, the lateral support member (7630) may include a plurality of leaf springs. The lateral support member (7630) may be formed with the same number as that of the upper support member (7610), for example. That is, the lateral support member (7630) may be divided to six (6) to be respectively connected to the upper support members (7610) that are divided to six pieces. In this case, the lateral support member (7630) can supply an electric power supplied from the stator (7400) or from outside to each of the upper support members (7610). The number of lateral support member (7630) may be determined in consideration of symmetry, for example. A total of eight (8) lateral support members (7630), two-member each at a corner of the housing (7310), may be formed, for example.

The lateral support member (7630) or the upper support member (7610) may include a shock absorption part (not shown) in order to absorb a shock, for example. The shock absorption part may be disposed on at least any one of the lateral support member (7630) and the upper support member (7610). The shock absorption part may be a separate member like a damper. Furthermore, the shock absorption part may be realized by change in shape to more than one part of any one of the lateral support member (7630) and the upper support member (7610).

The current carrying member (7640) may electrically connect the upper support member (7610) and the bottom support member (7620). The current carrying member (7640) may be separately formed from the lateral support member (7630). The power supplied to the upper support member (7610) through the current carrying member (7640) may be supplied to the bottom support member (7620), and the power may be supplied to the AF coil part (7220) through the bottom support member (7620). Meantime, as a modification, when the upper support member (7610) is directly connected to the AF coil part (7220), the current carrying member (7640) may be omitted.

The sensor part (7700) may be used for any one of auto focus feedback and handshake correction feedback. The sensor part (7700) may detect any one of position or movement of the first rotor (7200) and second rotor (7300). The sensor part (7700) may include an AF sensor part (7710) and an OIS sensor (7720), for example. The AF sensor part (7710) can provide information for AF feedback by sensing a relative vertical movement of the bobbin (7210) relative to the housing (7310). The OIS sensor (7720) can provide information for OIS feedback by detecting a horizontal movement or a tilt of the second rotor (7300).

The AF sensor part (7710) may be disposed at the first rotor (7200). The AF sensor part (7710) may be fixed by being inserted into a sensor guide groove (not shown) formed at an external circumferential surface of the bobbin (7210). The AF sensor part (7710) may include a first sensor (7711), a flexible FPCB (7712) and a terminal part (7713), for example.

The first sensor (7711) may detect a movement or a position of the bobbin (7210). Alternatively, the first sensor (7711) may detect a position of the driving magnet part (7320) mounted on the housing (7310). The first sensor (7711) may be a Hall sensor, for example. In this case, the first sensor (7711) may detect a relative position change between the bobbin (7210) and the housing (7310) by detecting a magnetic force generated from the driving magnet part (7320). The flexible PCB (7712) may be mounted with a first sensor (7711). The flexible PCB (7712) may be formed with a strip shape, for example. At least a part of the flexible PCB (7712) may be inserted into a sensor guide groove by being formed with a shape corresponding to the sensor guide groove concavely formed at an upper surface of the bobbin (7210). The flexible PCB (7712) may be an FPCB. That is, the flexible PCB (7712) may be flexibly formed and bent in order to correspond to the sensor guide groove in terms of shape. The flexible P CB (7712) may be formed with a terminal part (7713).

The terminal part (7713) may supply an electric power to the first sensor (7711) through the flexible PCB (7712) by receiving the power. Furthermore, the terminal part (7713) may receive a control command relative to the first sensor (7711) or transmit a value sensed from the first sensor (7711). The terminal part (7713) may be provided in the number of four (4), and may be electrically connected to the upper support member (7610). In this case, two terminal parts (7713) may be used for receiving a power from the upper support member (7610), and the remaining two terminal parts (7713) may be used for receiving or transmitting information or a signal.

The OIS sensor (7720) may be disposed at the stator (7400). The OIS sensor (7720) may be disposed at an upper surface or a bottom surface of the OIS coil part (7410). The OIS sensor (7720) may be disposed at a sensor part accommodation groove (7530) formed at the second base (7500) by being arranged at a bottom surface of the OIS coil part (7410), for example. The OIS sensor (7720) may be a Hall sensor, for example. In this case, the OIS sensor (7720) can sense a relative movement of the second rotor (7300) relative to the stator (7400) by sensing a magnetic field of the driving magnet part (7320). The Hall sensor may be mounted on the substrate (7420) through the SMT (Surface Mounting Technology). The OIS sensor (7720) can detect both x axis and y axis movements of the second rotor (7300) by being formed in the number of more than two.

The circuit element unit (800) may be mounted on a circuit substrate (100). The circuit element unit (800) may be disposed at an element accommodation part (430) of the first base (400). The circuit element unit (800) may be opened at an upper side. The circuit element unit (800) may not be overlapped with the first base (400) to the optical axis direction. That is, the circuit element unit (800) may be exposed to an upper side.

The circuit element unit (800) may include a plurality of circuit elements each spaced apart from the other element. The circuit element unit (800) may include first to fourth circuit elements (801, 802, 803, 804), each spaced apart from the other. The first to fourth circuit elements (801, 802, 803, 804) may be accommodated in one accommodation part forming the element accommodation part (430) and may be divisibly accommodated in a plurality of accommodation parts.

Hereinafter, the effect of camera module according to the first exemplary embodiment of the present disclosure will be described with reference to FIG. 7.

FIG. 7 is a cross-sectional view illustrating a camera module according to (a) a comparative example and (b) an exemplary embodiment of the present disclosure in order to explain an effect of a first exemplary embodiment of the present disclosure.

Referring to FIG. 7(a), it can be ascertained from FIG. 7(a) that a first base (400) of mold material supporting a filter (600) is existent at an upper side of the current carrying part (300) in the camera module according to the comparative example. In the case of comparative example, an FBI (L1), a distance from an upper surface of the image sensor of the camera module to a bottom surface of the lens module (500), is increased due to thickness of the first base (400).

Furthermore, it can be ascertained from the camera module according to the comparative example that the first base (400) is existent at an upper side of the circuit element unit (800). In the case of comparative example, a height of a bottom end surface of the lens driving unit (700) supported by the cover member support part (420) is increased due to thickness of the cover member support part (420) of the first base (400). As a result, a whole length (H1 of FIG. 7) of the camera module is also lengthened.

Referring to FIG. 7(b), it can be ascertained the camera module according to the first exemplary embodiment of the present disclosure that the injection-molded first base (400) supporting the filter (600) has been escaped to an outside. That is, it can be ascertained that the first base (400) is not overlapped with the current carrying part (300) to the optical axis direction in the camera module according to the first exemplary embodiment of the present disclosure.

Thus, in comparison with the comparative example, the lens module (500) can be so designed as to reduce the FBL as much as the injection-molded material supporting the filter (600) in the first exemplary embodiment of the present disclosure. That is, an FBL (L2), a distance from an upper surface of the image sensor (200) to a bottom surface of the lens module (500), can be minimized through the camera module according to the first exemplary embodiment of the present disclosure. Furthermore, an entire length of the camera module can be minimized because of the minimized FBL.

Meantime, it can be ascertained from the camera module according to the first exemplary embodiment of the present disclosure that the thickness of the cover member support part (420) can be minimized by omitting a part of the first base (400) and by opening a ceiling of the circuit element unit (800). That is, it can be ascertained from the camera module according to the first exemplary embodiment of the present disclosure that the first base (400) is prevented from overlapping with the circuit element unit (800) in the optical axis direction.

Thus, in comparison with the comparative example, a bottom end surface of the lens driving unit (700) can be decreased as much as the reduced thickness of the cover member support part (420) according to the first exemplary embodiment of the present disclosure. Hence, the whole length (H2 of FIG. 7) of the camera module can be minimized according to the first exemplary embodiment of the present disclosure.

Hereinafter, a configuration of a camera module according to a modification of the first exemplary embodiment of the present disclosure will be described with reference to FIG. 8.

Figure 8:
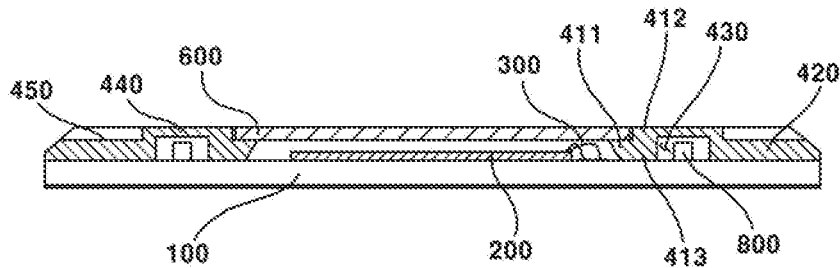
FIG. 8 is cross-sectional view illustrating a partial configuration of a camera module according to a modification of a first exemplary embodiment of the present disclosure.

FIG. 8 is cross-sectional view illustrating a partial configuration of a camera module according to a modification of a first exemplary embodiment of the present disclosure.

Referring to FIGS. 5 and 8, the camera module according to the modification in the first exemplary embodiment of the present disclosure may further comprise an extension part (440) in comparison with the camera module according to the first exemplary embodiment of the present disclosure.

The extension part (440) can connect a filter support part (410) to a cover member support part (420). The extension part (440) may be integrally formed with the filter support part (410) and the cover member support part (420). The extension part (440) may be disposed at an upper side of the circuit element unit (800) mounted on the circuit board (100).

The camera module according to the modification in the first exemplary embodiment of the present disclosure may further comprise an indent part (450) in comparison with the camera module according to the first exemplary embodiment of the present disclosure. The indent part (450) may be formed by indentation of at least one part of an upper surface of the cover member support part (420).

Meantime, the element accommodation part (430) in the modification may not pass through the first base (400) in the optical axis direction. That is, the element accommodation part (430) in the modification may be a groove where a part of a bottom surface of the first base (400) is upwardly indented.

Although the circuit element unit (800) mounted on the circuit board (100) is exposed to an upper side in the camera module according to the first exemplary embodiment of the present disclosure, the circuit element unit (800) mounted on the circuit board (100) may not be exposed in the modification of the camera module according to the first exemplary embodiment of the present disclosure. Thus, the modification has an advantageous effect over the first exemplary embodiment in that the foreign objects are prevented from entering the circuit element unit (800) through the upper side to thereby protect the circuit element unit (800). However, the first exemplary embodiment of the present disclosure may be advantageous over the modification in that a whole length to the optical axis direction of the camera module may be further shortened because the length in the optical axis direction in a structure supporting the cover member (700) is shorter than that in the modification.

Hereinafter, a configuration of a camera module according to a second exemplary embodiment of the present disclosure will be described with reference to accompanying drawings.

Figure 9:
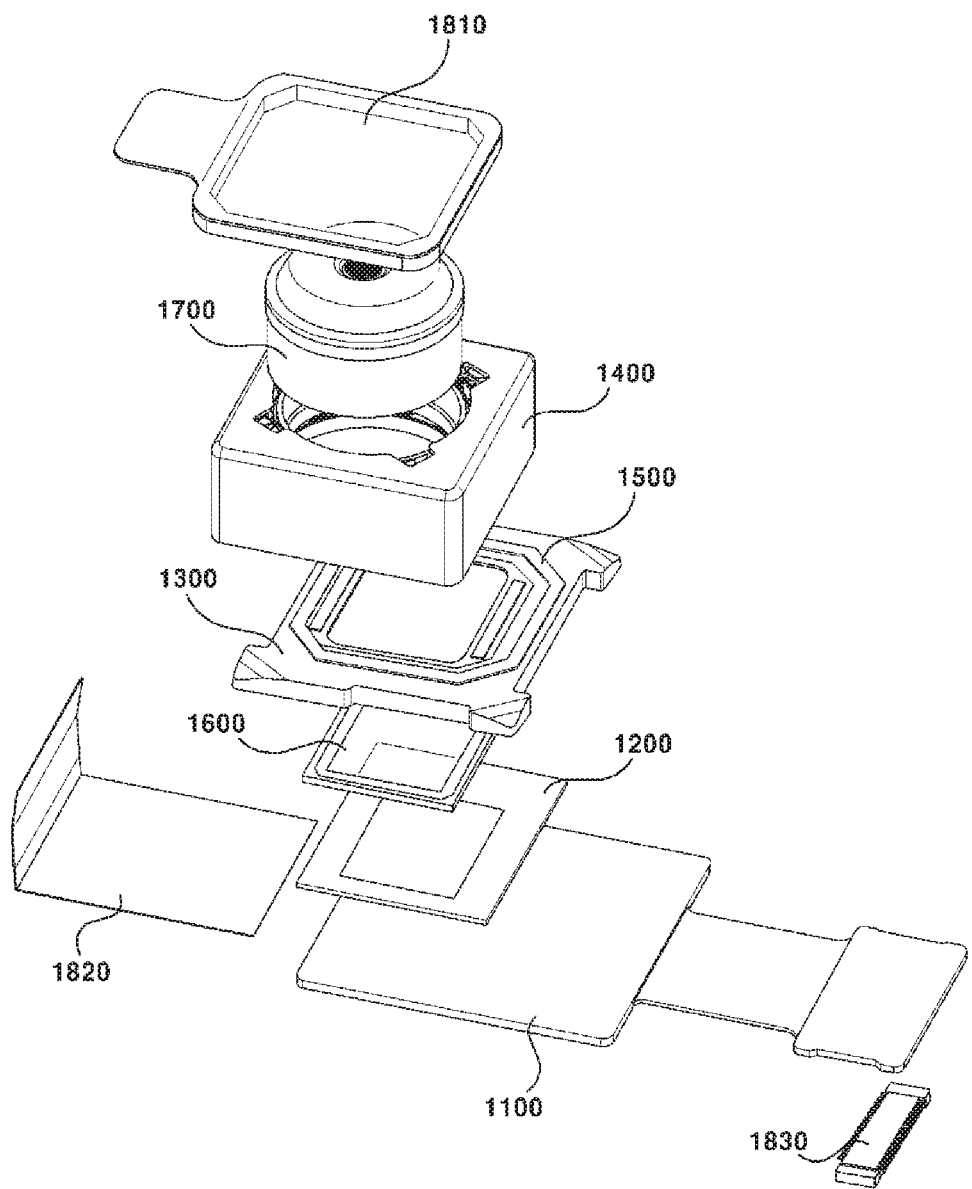
FIG. 9 is a perspective view of a camera module according to a second exemplary embodiment of the present disclosure.
Figure 10:
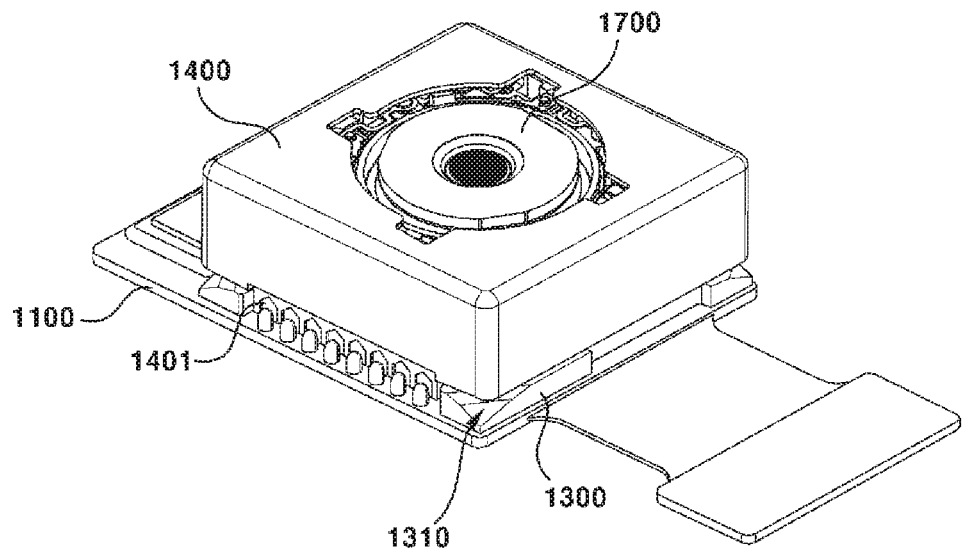
FIG. 10 is an exploded perspective view of a camera module according to a second exemplary embodiment of the present disclosure.
Figure 11:
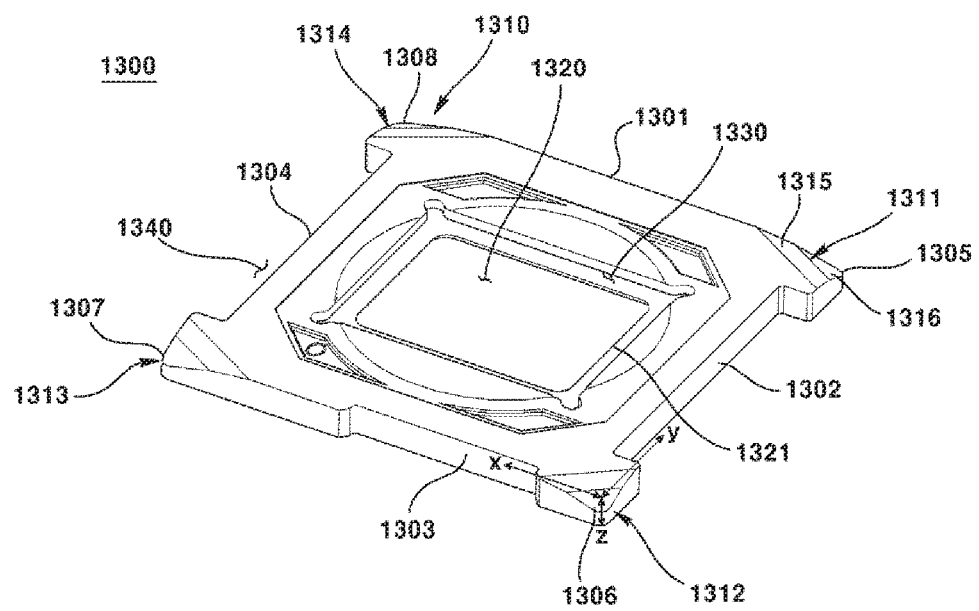
FIG. 11 is a perspective view of a sensor base according to a second exemplary embodiment of the present disclosure.
Figure 12:
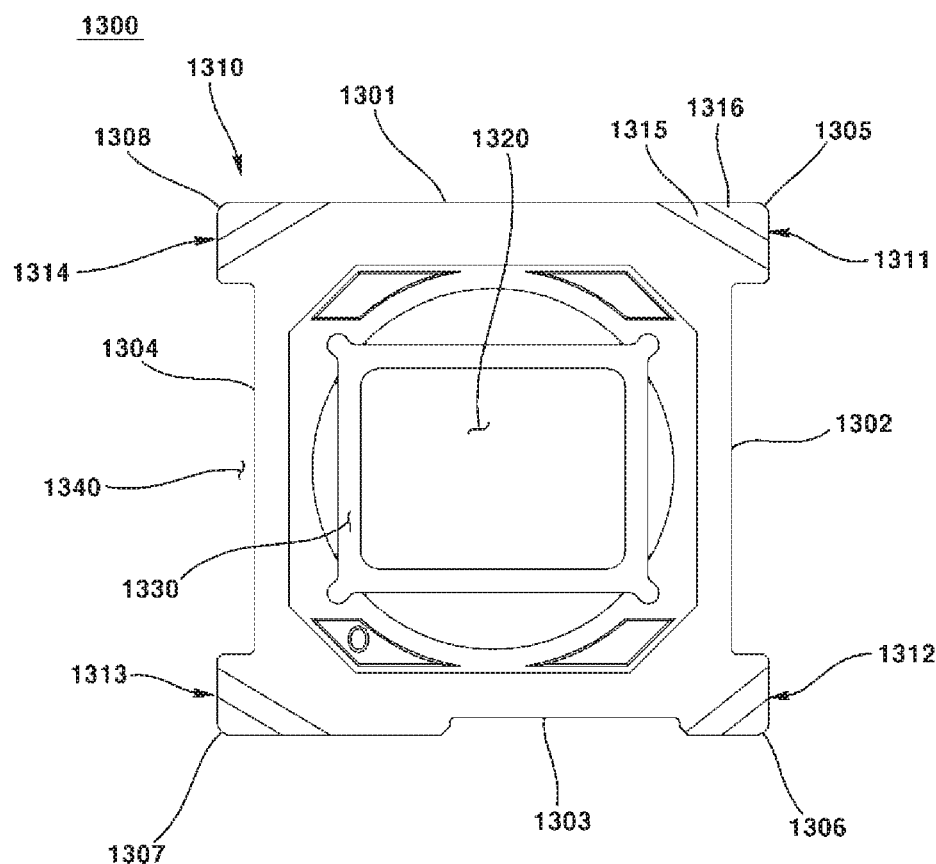
FIG. 12 is a plane view of a sensor base according to a second exemplary embodiment of the present disclosure.
Figure 13:
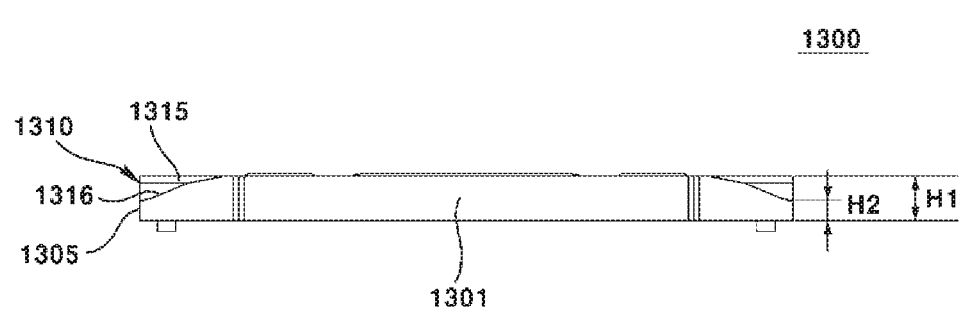
FIG. 13 is a lateral view of a sensor base according to a second exemplary embodiment of the present disclosure.

FIG. 9 is a perspective view of a camera module according to a second exemplary embodiment of the present disclosure, FIG. 10 is an exploded perspective view of a camera module according to a second exemplary embodiment of the present disclosure, FIG. 11 is a perspective view of a sensor base according to a second exemplary embodiment of the present disclosure, FIG. 12 is a plane view of a sensor base according to a second exemplary embodiment of the present disclosure, and FIG. 13 is a lateral view of a sensor base according to a second exemplary embodiment of the present disclosure.

The camera module may include a circuit board (1100), an image sensor (1200), a sensor base (1300), a lens driving unit (1400), an adhesive member (1500), a filter (1600), and a lens module (1700). However, any one or more of the circuit board (1100), the image sensor (1200), the sensor base (1300), the lens driving unit (1400), the adhesive member (1500), the filter (1600), and the lens module (1700) may be omitted. Meantime, the camera module may further include a lens protection tape (1810), an insulation tape (1820) and a connector (1830).

The circuit board (1100) may be disposed with an image sensor (1200). The circuit board (1100) may be disposed at an upper surface with the image sensor (1200). The sensor base (1300) may be 3 disposed at an upper surface of the circuit board (1100).

The circuit board (1100) may support the sensor base (1300). The circuit board (1100) may be disposed at an inner side of the upper surface with the image sensor (1200), and may be disposed at an outside of an upper surface thereof with the sensor base (1300). The circuit board (100) may be disposed at an outside of upper surface thereof with the sensor base (1300). The sensor base (1300) may be disposed at an upper side with a lens driving unit (1400).

Through this structure, a light having passed the lens module (1700) accommodated at an inside of the lens driving unit (1400) may be irradiated on the image sensor (1200) mounted on the circuit board (1100). The circuit board (1100) can supply an electric power to the lens driving unit (1400). Meantime, the circuit board (1100) may be disposed with a controller (not shown) in order to control the lens driving unit (1400).

The controller may control a direction, intensity and an amplitude of a current supplied to each of the elements forming the lens driving unit (1400). The controller may perform at least any one of autofocus function and handshake correction function of a camera module by controlling the lens driving unit (1400). That is, the controller can move or tilt the lens module to an optical axis direction or to a direction vertical to the optical axis direction by controlling the lens driving unit (1400).

Furthermore, the controller can perform the feedback control of autofocus function and handshake correction function. To be more specific, the controller can control the power or the current applied to the AF coil part (not shown) and/or the ON coil par (not shown) by receiving a position of the lens module (1700) detected by the sensor part (not shown), whereby a more accurate autofocus function and handshake correction function can be provided.

The image sensor (1200) may be disposed at an upper surface of the circuit board (1100). The image sensor (1200) may be mounted on the circuit board (1100). The image sensor (1200) may be accommodated at an inside of the sensor base (1300). The image sensor (1200) may be disposed at a bottom side of a through hole (1320) of the sensor base (1300). The image sensor (1200) may be disposed at a bottom side of the filter (1600). The image sensor (1200) may be so disposed as to conform to the lens module (1700) in terms of optical axis, whereby the image sensor (1200) can obtain a light having passed the lens module (1700). The image sensor (1200) may include any one or more than any one of a CCD (Charged Coupled Device), a MOS (Metal Oxide Semi-Conductor), a CPD and a OD. However, the present disclosure is not limited thereto.

The sensor base (1300) may be disposed at an upper surface of the circuit board (1100). The sensor base (1300) may be disposed at an inside of the image sensor (1200). The sensor base (1300) may be coupled at an upper side with the lens driving unit (1400).

The sensor base (1300) may include a first external surface (1301), a second external surface (1302) adjacent to the first external surface (1301) and a first corner part (1305) interposed between the first and second external surfaces (1301, 1302). The sensor base (1300) may include continuously adjacent first to fourth external surfaces (1301, 1302, 1303, 1304). The sensor base (1300) may include a first external surface (1301) adjacent to the second and fourth external surfaces (1302, 1304).

The sensor base (1300) may include a second external surface (1302) adjacent to the first and third external surfaces (1301, 1303). The sensor base (1300) may include a third external surface (1303) adjacent to the fourth and second external surfaces (1304, 1302). The sensor base (1300) may include a fourth external surface (1304) adjacent to the first and third external surfaces (1301, 1303). The sensor base (1300) may include first to fourth corner parts (1305, 1306, 1307, 1308) interposed between the first to fourth external surfaces (1301, 1302, 1303, 1304).

The sensor base (1300) may include a first corner part (1305) interposed between the first and second external surfaces (1301, 1302). The sensor base (1300) may include a second corner part (1306) interposed between the second and third external surfaces (1302, 1303). The sensor base (1300) may include a third corner part (1307) interposed between the third and fourth external surfaces (1303, 1304). The sensor base (1300) may include a fourth corner part (1308) interposed between the fourth and first external surfaces (1304, 1301).

The sensor base (1300) may include a guide part (1310) formed by being caved in at a part of an upper surface of the sensor base (1300). The guide part (1310) may be formed by being caved in to a bottom side at a part of an upper surface of the sensor base (1300). The guide part (1310) may be disposed at the first to fourth corner parts (1305, 1306, 1307, 1308) of the sensor base (1300). That is, the guide part (1310) may be respectively disposed at each of four corner parts (1305, 1306, 1307, 1308) of the sensor base (1300).

The guide part (1310) may be formed with a chamfer shape. The guide part (1310) may be formed with a shape to broaden an irradiation angle of light relative to the adhesive member (1500) disposed at an upper surface of the sensor base (1300) from outside. The guide part (1310) may include a first chamfer part (1315) having a first slope angle. The guide part (1310) may include a second chamfer part (1316) different from the first slope angle.

At this time, the first slope angle may be an angle formed between (by) an upper surface or a bottom surface of the sensor base (1300) and the first chamfer part (1315), and the second slope angle may be an angle formed between (by) an upper surface or a bottom surface of the sensor base (1300) and the second chamfer part (1316). The first chamfer part (1315) may include a first slope angle. The second chamfer part (1316) may include a second slope angle different from the first slope angle. The first and second chamfer parts (1315, 1316) may be continuously arranged from an inside to an outside. Meantime, the second slope angle may be greater than the first slope angle. The second chamfer part (1316) may be disposed at an outside of the first chamfer part (1315). That is, the guide part (1310) may be formed to have a greater slope angle toward the outside from the inside.

The guide part (1310) may perform a function of preventing dimensions from going over after adhesive reinforcing work to improve the adhesiveness between the sensor base (1300) and the lens driving unit (1400). To be more specific, because the adhesive coated in response to the reinforcing work flows to the guide part (1310), the phenomenon may be reduced in which the adhesive coated in response to the reinforcing work is protruded to a lateral side of the sensor base (1300) and the lens driving unit (1400).

The guide part (1310) may be determined in its shape in response to a dimension relative to a first axis (x axis of FIG. 11) and a second axis (y axis of FIG. 11) arranged in a horizontal direction and to a dimension relative to a third axis (z axis of FIG. 11) arranged in a vertical direction. At this time, the first, second and third axes may form a 90° thereamong. The guide part (1310) may be changed in its shape in response to sizes of x, y, z axes. The sensor base (1300) may also be variably formed from a four-angled shape to a polygonal shape in response to the shape of the guide part (1310). By way of example, the sensor base (1300) may be formed approximately with a hexahedron shape in terms of overall external look. That is, the sensor base (1300) may be of a square shape when viewed from an upper side. However, as a modification, when a size (z axis value) relative to the third axis of the guide part (1310) from the first to four corner parts (1305, 1306, 1307, 1308) of the sensor base (1300) is increased, a shape of a bottom surface of the sensor base (1300) attached to the circuit board (1100) may become to look like a pentagonal shape from a previous square shape. In this case, the adhesive force of an adhesive coated in response to the reinforcing work may be improved while the adhesive flows down to a surface of the circuit board (1100), and the dimensional stability may be also further secured.

Although the guide part (1310) has been explained as being formed on the sensor base (1300), the guide part (1310) may be formed at the lens driving unit (1400). That is, the lens driving unit (1400) may be formed at a bottom surface with a guide part (1310) that is caved in to an upper side. At this time, the guide part (1310) may take a chamfer shape. However, the present disclosure is not limited thereto, and the guide part (1310) may take any shape as long as a transmission space of UV light can be secured through the guide part (1310).

The sensor base (1300) may include a through hole (1320) through which the sensor base (1300) passes in an optical axis direction. Here, the "optical axis direction" may be interchangeably used with the "vertical direction". The through hole (1320) may pass through the sensor base (1300) in a vertical direction. The through hole (1320) may be disposed at an upper side of the image sensor (1200). The through hole (1320) may be formed by an inner lateral surface of the sensor base (1300). The inner lateral surface of the sensor base (1300) forming the through hole (1320) may face the first external surface (1301). A length in the vertical direction from a center of the first external surface (1301) may be equal to that of the first internal surface (1321) in the vertical direction. Alternatively, a length in the vertical direction from a center of the first external surface (1301) may be longer than that of the first internal surface (1321) in the vertical direction.

The sensor base (1300) may include a filter accommodation part (1330) formed by being caved in to a bottom side at a part of the upper surface of the sensor base (1300). The filter accommodation part (1330) may be formed by being caved in to a bottom side at a part of the upper surface of the sensor base (1300). The filter accommodation part (1330) may be accommodated with a filter (1600).

The sensor base (1300) may include a substrate accommodation part (1340) accommodating at least a part of a substrate (not shown) of the lens driving unit (1400). The substrate accommodation part (1340) may accommodate at least a part of the substrate of the lens driving unit (1400). The substrate accommodation part (1340) may be formed by being caved in to an inside at a part of the external lateral surface of the sensor base (1300).

An adhesive member (1500) may be interposed between the sensor base (1300) and the lens driving unit (1400). The adhesive member (1500) may be interposed between an upper surface of the sensor base (1300) and a bottom surface of the lens driving unit (1400).

The lens driving unit (1400) may be coupled to an upper side of the sensor base (1300). The lens driving unit (1400) may be coupled to an upper surface of the sensor base (1300) by the adhesive member (1500). The lens driving unit (1400) may perform an autofocusing function by moving the lens module (1700) to an optical axis direction. The lens driving unit (1400) can perform the handshake correction function by moving or tilting the lens module (1700) to a direction perpendicular to the optical axis direction.

The lens driving unit (1400) may include a cover member (not shown), a first rotor, a second rotor, a stator, a base, a support member and a sensor part. However, any one or more of the cover member, the first rotor, the second rotor, the stator, the base, the support member and the sensor part in the lens driving unit (1400) according to the second exemplary embodiment of the present disclosure may be omitted.

The lens driving unit (1400) according to the second exemplary embodiment of the present disclosure may be applied with the explanation of the lens driving unit (700) according to the first exemplary embodiment of the present disclosure.

The cover member may form an external shape of the lens driving unit (1400). The cover member may take a shape of a hexahedron opened at a bottom surface. However, the present disclosure is not limited thereto. The cover member may include an upper plate and a lateral plate extended from an outside of the upper plate to a bottom side. Meantime, a bottom end of the lateral plate of the cover member may be mounted on a base. An inner space formed by the cover member and the base may be disposed with a first rotor, a second rotor, a stator and a support member. Furthermore, the cover member may be mounted on the base by being tightly contacted at an inner lateral surface to a part or a whole area of lateral surface of the base. Thus, the cover member can perform the functions of protecting inner constituent elements from outside shock and simultaneously preventing foreign objects from penetrating to an inside.

The cover member may be formed with a metal material, for example. To be more specific, the cover member may be formed with a metal plate. In this case, the cover member can block electric wave interference. That is, the cover member can block the electric wave generated from outside of the lens driving unit from entering an inside of the cover member. Furthermore, the cover member can block the electric wave generated from inside of the cover member from emitting to the outside of the cover member. However, the material of cover member is not limited thereto.

The cover member may include an opening formed at an upper plate to expose the lens module (1700). The opening may be formed in a shape corresponding to that of the lens module (1700). The size of the opening may be formed to be greater than a diameter of the lens module (1700) to allow the lens module (1700) to be assembled through the opening. Furthermore, a light introduced through the opening may pass through the lens module (1700). Meantime, the light having passed the lens module (1700) may be transmitted to the image sensor.

The first rotor may be coupled with the lens module (1700). The lens module (1700) may be disposed at an inside of the first rotor. An inner surface of the first rotor may be coupled with an external circumferential surface of the lens module (1700). Meantime, the first rotor may integrally move with the lens module (1700) through an interaction with a second rotor. That is, the first rotor can move the lens module (1700).

The first rotor may include a bobbin and an AF coil part. The first rotor may include a bobbin that is coupled with the lens module (1700). The first rotor may include an AF coil part disposed at the bobbin to be moved by electromagnetic interaction with a driving magnet part.

The bobbin may be coupled with the lens module (1700). To be more specific, the bobbin may be coupled at an inner circumferential surface by the external circumferential surface of the lens module (1700). Meantime, the bobbin may be coupled with the AF coil part. Furthermore, the bobbin may be coupled at a bottom surface with a bottom support member and may be coupled at an upper surface with an upper support member. The bobbin may be disposed at an inside of a housing. The bobbin may relatively move to an optical axis direction relative to the housing.

The bobbin may include a lens coupling part formed at an inside thereof. The lens coupling part may be coupled by the lens module (1700). An inner circumferential surface of the lens coupling part may be formed with a screw thread having a shape corresponding to that of a screw thread formed at the external circumferential surface of the lens module (1700). That is, an inner circumferential surface of the lens coupling part may be screw-connected by the external circumferential surface of the lens module (1700). Meantime, an adhesive may be injected between the lens module (1700) and the bobbin. At this time, the adhesive may be an epoxy that is cured (hardened) by UV (Ultraviolet). That is, the lens module (1700) and the bobbin may be adhered by UV-curing epoxy. Alternatively, the lens module (1700) and the bobbin may be adhered by heat-curing epoxy.

The bobbin may include a first driving part coupling part wound or mounted with an AF coil part. The first driving part coupling part may be integrally formed with an external lateral surface of the bobbin. Furthermore, the first driving part coupling part may be continuously formed along the external lateral surface of the bobbin, or formed by being spaced apart at a predetermined distance. The first driving part coupling part may include an indent part formed by a part of the external lateral surface of the bobbin being caved in. The indent part may be disposed with an AF coil part, where the AF coil part may be supported by the first driving part coupling part.

By way of example, the first driving part coupling part may be formed by parts protruded at upper and bottom sides of the indent part being disposed, where a coil of the first driving part may be directly wound on the indent part of the first driving part coupling part. Alternatively, by way of another example, the first driving part coupling part may take a shape of upper side or a bottom side of the indent part being opened, and formed at the other side by being disposed with a hitching part, where the coil of the first driving part may be coupled by being inserted through the opened part while the coil is in a pre-wound state.

The bobbin may include an upper coupling part coupled to an upper support member. The upper coupling part may be coupled to an inner lateral part of the upper support member. For example, a lug of the upper coupling part may be coupled by being inserted into a groove or a hole at the inner lateral part.

The bobbin may include a bottom coupling part coupled to a bottom support member. The bottom coupling part formed at a bottom surface of the bobbin may be coupled with an inner lateral part of the bottom support member. For example, a lug of the bottom coupling part may be coupled by being inserted into a groove or a hole of the inner lateral part.

The AF coil part may be disposed by facing or being opposite to a driving magnet part of the second rotor. The AF coil part may move the bobbin through an electromagnetic interaction with the driving magnet part relative to the housing. The AF coil part may include a coil. The coil may be guided by the first driving part coupling part to be wound on the external lateral surface of the bobbin. Furthermore, by way of another example, the AF coil part may be arranged at the external lateral surface of the bobbin to allow four independent coils to be disposed and to allow two adjacent coils to form an angle of 90° therebetween.

The AF coil part may receive an electric power through the bottom support member. At this time, the bottom support member may be divisably formed in a pair in order to supply the electric power to the AF coil part. Meantime, the AG coil part may include a pair of leader lines in order to supply the electric power to the AF coil part. In this case, each of the pair of leader lines on the AF coil part may be electrically coupled to a pair of bottom support members. Alternatively, the AF coil part may receive the electric power from the upper support member.

Meantime, the AF coil part may be formed at a surrounding with an electromagnetic field when the power is supplied to the AF coil part. By way of another example, the AF coil part and the driving magnet part may be so arranged as to exchange their positions.

The second rotor may be disposed opposite to the first rotor at an external side of the first rotor. The second rotor may be supported by a base disposed at a bottom surface thereof. The second rotor may be supported by a fixed member. At this time, the fixed member may include a base and a stator. That is, the second rotor may be supported by the base and/or the stator. The second rotor may be disposed at an inner space of the cover member.

The second rotor may include a housing and a driving magnet part. The second rotor may include a housing disposed at an outside of the bobbin. Furthermore, the second rotor may be disposed opposite to the AF coil part to include a driving magnet part fixed to the housing.

At least one part of the housing may be formed with a shape corresponding to that of an inner lateral surface of the cover member. Inter alia, an external lateral surface of the housing may be formed with a shape corresponding to an inner lateral surface of a lateral plate of the cover member. The external lateral surface of the housing and the inner lateral surface of the lateral plate may be flatly formed. To be more specific, when the housing is at an initial position, the external lateral surface of the housing and the inner lateral surface of the lateral plate may be flatly formed.

In this case, when the housing is moved maximally to a cover member side, the external lateral surface of the housing and the inner lateral surface of the lateral plate may surface-contact to disperse a shock generated from the housing and/or the cover member. The housing may take a shape of a hexahedron including four lateral surfaces, for example. However, the shape of the housing may take any shape as long as the housing is arranged inside the cover member. The housing may be coupled at an upper surface with the upper support member, and may be coupled at a bottom surface with the bottom support member.

The housing may be formed with an insulating material, and may be formed with an injection-molded material in consideration of productivity. The housing is a moving part for OIS driving, and may be spaced apart from the cover member at a predeterminate distance. However, in case of AF model, the housing may be fixed on the base. Alternatively, the housing may be omitted in case of the AF model, and the driving magnet part may be fixed on the cover member.

The housing may be opened at an upper side and a bottom side to movably accommodate the first rotor to a vertical direction. The housing may include an upper/bottom opened inner space at an inside of the housing. The inner space may be movably disposed therein with a bobbin. That is, the inner space may take a shape corresponding to that of the bobbin. Furthermore, an inner circumferential surface of the housing forming the inner space may be spaced apart from the external circumferential surface of the bobbin. The housing may be movably supported relative to the base. That is, the housing may be moved or tilted to a horizontal direction based on the base.

The housing may include a second driving part coupling part formed at a lateral surface with a shape corresponding to that of the driving magnet part to accommodate the driving magnet part. That is, the second driving part coupling part may be fixed by accommodating the driving magnet part. The driving magnet part may be fixed to the second driving part coupling part by an adhesive. Meantime, the second driving part coupling part may be disposed at an inner lateral part of housing, which is advantageous to the electromagnetic interaction with the AF coil part disposed at an inside of the driving magnet part. Furthermore, the second driving part coupling part may take a shape opened at a bottom surface, for example, which is advantageous to the electromagnetic interaction between a substrate disposed at a bottom side of the driving magnet part and the driving magnet part. By way of example, a bottom end of the driving magnet part may be so disposed as to allow more protruding downward than a bottom end of the housing. The second driving part coupling part may be formed in the number of four (4), for example. Each of the second driving part coupling part may be coupled by the driving magnet part.

The housing may include an upper coupling part coupled with the upper support member. The upper coupling part may be coupled to an external lateral part of the upper support member. By way of example, a lug of the upper coupling part may be coupled by being inserted into a groove or a hole of the external lateral part.

The housing may include a bottom coupling part coupled to the bottom support member. The bottom coupling part formed at a bottom surface of the housing may be coupled to an external lateral part of the bottom support member. By way of example, a lug of the bottom coupling part may be coupled by being inserted into a groove or a hole of the external lateral part.

The housing may include a first lateral surface, a second lateral surface adjacent to the first lateral surface and a corner part disposed between the first and second lateral surfaces. The corner part of the housing may be disposed with an upper stopper. The upper stopper may be overlapped with the cover member to a vertical direction. When the housing is moved upward by an external shock, the upper stopper may restrict an upward movement of the housing by being contacted to the cover member.

The driving magnet part may be disposed opposite to the AF coil part of the first rotor. The driving magnet part may move the AF coil part through the electromagnetic interaction with the AF coil part. The driving magnet part may include a magnet. The magnet may be fixed to the second driving part coupling part of the housing. The driving magnet part may be arranged at the housing to allow four independent magnets to be disposed and to allow two adjacent magnets to form an angle of 90° therebetween as illustrated in FIG. 10.

That is, the driving magnet part may be mounted at four lateral surfaces of the housing, each at an equidistance, to promote an efficient use of an inner volume. Furthermore, the driving magnet part may be adhered to the housing using an adhesive, but the present disclosure is not limited thereto.

The stator may be disposed at the base. The stator may be disposed opposite to a bottom side of the second rotor. The stator may movably support the second rotor. The stator may move the second rotor. The stator may be disposed at a center with a through hole corresponding to the lens module (1700). Because the stator may be formed with a terminal part (1401) to directly and electrically communicate with the outside according to the second exemplary embodiment of the present disclosure, there is required no separate FPCB. Thus, the second exemplary embodiment of the present disclosure may expect a cost reduction effect because the number of parts, the number of procedures and reduced process management points in comparison with a model that is separately mounted with an FPCB and a pattern coil. Furthermore, the entire height of the product is reduced to contribute to the miniaturization of the product.

The stator may include an OIS coil part and a substrate, for example. The stator may include an OIS coil part arranged at the substrate. The stator may include a substrate accommodated at the base by being disposed opposite to a bottom side of the driving magnet part. The stator may include a terminal part (1401) extended by being bent from the substrate to a bottom side.

The OIS coil part may face the driving magnet part. The OIS driving coil part may move the driving magnet part through an electromagnetic interaction. When a power is applied to the OIS coil part, the driving magnet part and the housing fixed by the driving magnet part may integrally move through an electromagnetic interaction with the driving magnet part. The OIS coil part may be mounted on the substrate, electrically connected to the substrate or integrally formed with the substrate.

The OIS coil part may be an FP (Fine Pattern) coil, for example, and may be arranged, mounted or formed at the substrate. The OIS coil part may be so formed as to minimize an interference with an OIS sensor disposed at a bottom side, for example. The OIS coil part may be so formed as not to overlap with the OIS sensor to a vertical direction. The OIS sensor may be so mounted at a bottom side of the stator as to prevent overlap with the OIS coil part to a vertical direction. The OIS coil part may be arranged by being changed in position with the driving magnet part.

The substrate may be accommodated on the base. Meantime, the substrate can supply an electric power to the AF coil part. By way of example, the substrate can supply the power to the AF coil part through a lateral support member, an upper support member, a current carrying member and a bottom support member. Alternatively, the substrate can supply the power to the AF coil part through the lateral support member and the upper support member.

The substrate may support from a bottom side in order to move or tilt the housing to a horizontal direction. The substrate may be coupled with the housing through the lateral support member. The substrate may be disposed with an OIS sensor to detect a position or movement of the housing. The substrate may be disposed at an upper surface with the OIS coil part, and may be disposed at a bottom surface with the OIS sensor.

The substrate may include a through hole. The substrate may include a through hole allowing a light having passed the lens module (1700) to pass therethrough. The through hole may be formed at a center of the substrate. The through hole may be formed with a round shape, but the present disclosure is not limited thereto.

The terminal part (1401) may be connected to an outside electric power source through which the substrate is supplied with the power. The terminal part (1401) may be formed by being extended from a lateral side of the substrate. The terminal part (1401) may be disposed at both sides of the substrate. The substrate and the terminal part (1401) may be integrally formed. The terminal part (1401) may be formed to be smaller than a width of the substrate. The terminal part (1401) may be accommodated in to a terminal accommodation part formed by a part of a lateral surface of the base being caved in. The terminal accommodation part may be formed with a width corresponding to that of the terminal part (1401).

The base may support the second rotor. The base may be disposed at a bottom side with a sensor base (1300). Meantime, any one of the sensor base (1300) and the base may be omitted, and the base and the sensor base (1300) may be integrally formed. The base may include a through hole formed at a position corresponding to that of the lens coupling part of the bobbin.

The base may include a foreign object collection part collecting foreign objects introduced into the cover member, for example. The foreign object collection part may be disposed at a position at an upper surface of the base to collect foreign objects including an adhesive material and a foreign object at an inside space formed by the cover member and the base.

The base may include a sensor part accommodation groove coupled by the OIS sensor. That is, the ON sensor may be mounted on the sensor part accommodation groove. At this time, the OIS sensor may detect a horizontal movement or tilt of the housing by detecting a driving magnet part coupled to the housing. The sensor part accommodation groove may be formed in the number of two (2), for example. Each of the two sensor part accommodation grooves may be disposed with the OIS sensor. In this case, the OIS sensor may be so arranged as to detect both x axis direction movement and y axis direction movement of the housing. That is, an imaginary line connecting each of the two OIS sensors and the optical axis may cross at a right angle.

The support member may connect two or more of a first rotor, a second rotor, a stator and a base. The support member may elastically connect two or more of the first rotor, the second rotor, the stator and the base to enable a relative movement between each element. The support member may be formed with an elastic member. The support member may include an upper support member, a bottom support member, a lateral support member and a current carrying member, for example. However, the current carrying member is disposed to carry a current for the upper support member and the bottom support member, such that the current carrying member may be explained by being discerned from the upper support member, the bottom support member, and the lateral support member.

The upper support member may include an external part, an internal part and a connection part, for example. The upper support member may include an external part coupled to the housing, an internal part coupled to the bobbin and a connection part elastically connecting the external part and the internal part.

The upper support member may be connected to an upper surface of the first rotor and to an upper surface of the second rotor. To be more specific, the upper support member may be coupled to an upper surface of the bobbin and to an upper surface of the housing. The internal part of the upper support member may be coupled to an upper lateral coupling part of the bobbin, and the external part of the upper support member may be coupled to an upper lateral coupling part of the housing.

The upper support member may be divisibly formed with six (6) upper current carrying parts, for example. At this time, the two (2) upper current carrying parts in the six current carrying parts may be electrically connected to be used for applying an electric power to the AF coil part. Each of the two upper current carrying parts may be electrically connected to each of a pair of bottom support members through a current carrying member. The remaining four (4) upper current carrying parts of the six upper current carrying parts may be electrically connected to the AF sensor part disposed at the bobbin. The remaining four (4) upper current carrying parts may supply an electric power to the AF sensor part and may be used for receipt and transmission of information and signals between a controller and the AF sensor part. Furthermore, as a modification, the two upper current carrying parts of the six upper current carrying parts may be directly connected to the AF coil part and the remaining four upper current carrying parts may be connected to the AF sensor part.

The bottom support member may include a pair of bottom support members, for example. That is, the bottom support member may include a first bottom support member and a second bottom support member. At this time, the bottom support member may be also explained as including two bottom current carrying parts. Each of the first bottom support member and the second bottom support member can supply an electric power by being connected to each of a pair of leader lines on the AF coil part formed by a coil. Meantime, the pair of bottom support members may be electrically connected to the OIS coil part. Through this type of structure, the pair of bottom support members can provide the electric power supplied from the OIS coil part to the AF coil part.

The bottom support member may include an external part, an internal part and a connection part. The bottom support member may include an external part coupled to the housing, an internal part coupled to the bobbin and a connection part elastically connecting the external part and the internal part.

The bottom support member may be connected to a bottom surface of the first rotor and to a bottom surface of the second rotor. To be more specific, the bottom support member may be connected to a bottom surface of the bobbin and to a bottom surface of the housing. The internal part of the bottom support member may be coupled with a bottom coupling part of the bobbin, and the external part of the bottom support member may be coupled with a bottom coupling part of the housing.

The lateral support member may be coupled at one side to the stator and/or to the base, and may be coupled at the other side to the upper support member and/or to the second rotor. The lateral support member may be coupled at one side to the stator and may be coupled at the other side to the housing, for example. Furthermore, by way of another example, the lateral support member may be coupled at one side to the base and may be coupled at the other side to the upper support member. As noted above, the lateral support member may elastically support the second rotor to allow the second rotor to horizontally move or tilt relative to the base.

The lateral support member may include a plurality of wires. Furthermore, the lateral support member may include a plurality of leaf springs. The lateral support member may be formed with the same number as that of the upper support member, for example. That is, the lateral support member may be divided to in the number of six (6) to be respectively connected to the upper support members that are divided to six pieces. In this case, the lateral support member can supply an electric power supplied from the stator or from outside to each of the upper support members. The number of lateral support member may be determined in consideration of symmetry, for example. A total of eight (8) lateral support members, two-member each at a corner of the housing, may be formed, for example.

The lateral support member or the upper support member may include a shock absorption part in order to absorb a shock, for example. The shock absorption part may be disposed on at least any one of the lateral support member and the upper support member. The shock absorption part may be a separate member like a damper. Furthermore, the shock absorption part may be realized by change in shape to more than one part of any one of the lateral support member and the upper support member.

The current carrying member may electrically connect the upper support member and the bottom support member. The current carrying member may be separately formed from the lateral support member. The power supplied to the upper support member through the current carrying member may be supplied to the bottom support member, and the power may be supplied to the AF coil part through the bottom support member. Meantime, as a modification, when the upper support member is directly connected to the AF coil part, the current carrying member may be omitted.

The sensor part may be used for more than one of auto focus feedback and handshake correction feedback. The sensor part may detect more than one of position or movement of the first rotor and second rotor. The sensor part may include an AF sensor part and an OIS sensor, for example. The AF sensor part can provide information for AF feedback by sensing a relative vertical movement of the bobbin relative to the housing. The OIS sensor can provide information for OIS feedback by detecting a horizontal movement or a tilt of the second rotor.

The AF sensor part may be disposed at the first rotor. The AF sensor part may be fixed by being inserted into a sensor guide groove formed at an external circumferential surface of the bobbin. The AF sensor part may include a first sensor, a flexible PCB and a terminal part, for example.

The first sensor may detect a movement or a position of the bobbin. Alternatively, the first sensor may detect a position of the driving magnet part mounted on the housing. The first sensor may be a Hall sensor, for example. In this case, the first sensor may detect a relative position change between the bobbin and the housing by detecting a magnetic force generated from the driving magnet part. The flexible PCB may be mounted with a first sensor. The flexible PCB may be formed with a strip shape, for example. At least a part of the flexible PCB may be inserted into a sensor guide groove by being formed with a shape corresponding to the sensor guide groove concavely formed at an upper surface of the bobbin. The flexible PCB may be an FPCB. That is, the flexible PCB may be flexibly formed and bent in order to correspond to the sensor guide groove in terms of shape. The flexible PCB may be formed with a terminal part.

The terminal part may supply an electric power to the first sensor through the flexible PCB by receiving the power. Furthermore, the terminal part may receive a control command relative to the first sensor or transmit a value sensed from the first sensor. The terminal part may be provided in the number of four (4), and may be electrically connected to the upper support member. In this case, two terminal parts may be used for receiving a power from the upper support member, and the remaining two terminal parts may be used for receiving or transmitting information or a signal.

The OIS sensor may be disposed at the stator. The OIS sensor may be disposed at an upper surface or a bottom surface of the OIS coil part. The OIS sensor may be disposed at a sensor part accommodation groove formed at the base by being arranged at a bottom surface of the OIS coil part, for example. The OIS sensor may be a Hall sensor, for example. In this case, the OIS sensor can sense a relative movement of the second rotor relative to the stator by sensing a magnetic field of the driving magnet part. The Hall sensor may be mounted on the substrate through the SMT (Surface Mounting Technology). The OIS sensor can detect both x axis and y axis movements of the second rotor by being formed in the number of more than two.

The AF coil part, the OIS coil and the driving magnet part are elements for performing a mutually electromagnetic interaction, where any one of the AF coil part, the OIS coil and the driving magnet part may be called a 'first driving part', another one may be called a 'second driving part', and the remaining one may be called a 'third driving part'. Although the aforementioned description has explained that the AF coil is disposed on the bobbin, the driving magnet part is disposed on the housing and the OIS coil is disposed on the substrate, the AF coil part, the OIS coil and the driving magnet part may be disposed by being exchanged in their positions.

The substrate of the lens driving unit (1400) may include a terminal part (1401). The terminal part (1401) may include a body part coupled to the OIS coil, and a terminal part (1401) extended by being bent to a bottom side from the body part. The terminal part (1401) may be accommodated with at least a part of the substrate accommodation part (1340) of the sensor base (1300).

The adhesive member (1500) may be interposed between the lens driving unit (1400) and the sensor base (1300). The adhesive member (1500) may be disposed between a bottom surface of the lens driving unit (1400) and an upper surface of the sensor base (1300). The adhesive member (1500) may be cured by UV epoxy. The adhesive member (1500) is a liquefied adhesive and may be cured by UV and cured in earnest by heat.

The filter (1600) may be accommodated in the filter accommodation part (1330). The filter (1600) may be disposed at an upper side of the image sensor (1200). The filter (1600) may include a UV filter. The UV filter may prevent a light of IR (Infrared) region from being incident on the image sensor (1200). The UV filter may be interposed between the lens module (1700) and the image sensor (1200). The IR filter may be an IR absorption filter absorbing the IR. Alternatively, the IR filter may be an IR reflection filter reflecting the IR. The filter (1600) may be formed with a film material or a glass material. The filter (1600) may be formed by coating an IR cut-off coating material on a flat type optical filter such as an imaging surface protection cover glass or a cover glass.

The lens module (1700) may include a lens and a lens barrel. The lens module (1700) may include one or more lenses and a lens barrel accommodating one or more lenses. However, a configuration of the lens module (1700) is not limited to the lens barrel, and any structure capable of holding one or more lenses may suffice for the lens module (1700). The lens module (1700) may move along with the lens driving unit (1400) by being coupled to the lens driving unit (1400). The lens module (1700) may be coupled to an inside of the lens driving unit (1400). The lens module (1700) may be screw-connected to the lens driving unit (1400). The lens module (1700) may be coupled to the lens driving unit (1400) using an adhesive. Meantime, a light having passed through the lens module (1700) may be irradiated on the image sensor (1200).

A lens protection tape (1810) may be covered on an upper surface of the lens module (1700) in order to protect the lens module (170) against damage. The lens protection tape (1810) may be fixed on an upper surface of the lens driving unit (1400). The lens protection tape (1810) may be removed in the course of assembling process.

An insulating tape (1820) may be arranged to cover a bottom surface of the circuit board (1100) and a part of a lateral surface of the lens driving unit (1400). The insulating tape (1820) can prevent the terminal part (1401) from being damaged by being disposed at an outside of the terminal part (1401) of the lens driving unit (1400) exposed to the outside. The insulating tape (1820) may be removed in the course of assembling process.

A connector (1830) may be electrically connected to the circuit board (1100). The connector (1830) may electrically connect a configuration of optical device with a camera module. That is, an image obtained through the camera module may be transmitted to other configurations inside the optical device through the connector (1830).

Hereinafter, a manufacturing method and an effect of a camera module according to the second exemplary embodiment of the present disclosure will be described with reference to the drawings.

The camera module according to the second exemplary embodiment of the present disclosure may be applied with an AA (Active Align) in the course of manufacturing process. To be more specific, the camera module according to the second exemplary embodiment of the present disclosure may be prepared with a lens driving unit (1400) coupled with the lens module (1700) and the sensor base (1300) coupled to the circuit board (1100) mounted with the image sensor (1200) in order to assemble the camera module. At this time, an upper surface of the sensor base (1300) may be coated with the adhesive member (1500) in order to encompass an outside of the filter accommodation part (1330) as illustrated in FIG. 9.

Thereafter, the upper surface of the sensor base (1300) is accommodated with the lens driving unit (1400) to align the lens module (1700) and the image sensor (1200) for optical axis alignment. When the lens module (700) and the image sensor (1200) are aligned on the optical axis, an UV light is irradiated between the sensor base (1300) and the lens driving unit (1400) to temporarily cure the adhesive member (1500). At this time, when the UV light is irradiated to the guide part (1310) disposed at the first to four corner parts (1305, 306, 307, 308), a much more quantity of UV light can be irradiated to the adhesive member (1500). Meantime, the assembly of the sensor base (1300) and the lens driving unit (1400) under the temporarily coupled state by the temporarily cured adhesive member (1500) may be moved to an oven (not shown). The adhesion between the sensor base (1300) and the lens driving unit (1400) can be completed in the oven by the in-earnest curing by heat.

However, when the guide part (1310) is not formed, the temporary curing cannot be performed in earnest due to a light-entering path being narrowed, because a distance between the sensor base (1300) and the lens driving unit (1400) is merely 0.1~0.2 mm.

That is, although the UV light is being irradiated from a lateral side, a light capable of curing an innermost area of the liquefied adhesive member (1500) becomes insufficient, because the adhesive member (1500) is interposed between the sensor base (1300) and the lens driving unit (1400) where no light is transmitted. In this case, there may be generated a phenomenon of a position of the lens driving unit (1400) being twisted relative to the sensor base (1300) during the transit. When the guide part (1310) is not formed, there may be generated a disadvantage of a curing time being lengthened or delayed in order to secure temporary contact stability.

A chamfer-shaped guide part (1310) is formed at the corner parts (1305, 306, 307, 308) of the sensor base (1300) according to the second exemplary embodiment of the present disclosure to enable an obtainment of a UV light transmission space.

That is, a UV light infuse space can be enlarged or broadened by securing a space among the corner parts (1305, 306, 307, 308) of the sensor base (1300) and a corner part of the lens driving unit (1400). Furthermore, the temporary contact stability relative to the lens position can be increased by obtainment of the UV curing energy. Still furthermore, the productivity can be increased by reduction in curing time.

Meantime, even if an adhesive reinforcing operation is performed in order to securely couple the sensor base (1300) and the lens driving unit (1400), a phenomenon of increasing the size of camera module due to the guide part (1310) can be prevented according to the second exemplary embodiment of the present disclosure. To be more specific, the guide part (1310) can become a space where the adhesive coated for reinforcement operation is introduced to thereby prevent the adhesive from being protruded up to an outside of the sensor base (1300). Furthermore, when a slope angle of the guide part (1310) becomes near to 90°, the reinforcing adhesive moved along the guide part (1310) can flow down on the upper surface of the circuit board (1100), whereby the adhesive force can be improved and the dimensional stability can be secured.

Although the foregoing has explained that all the elements forming the exemplary embodiment of the present disclosure are coupled or operated as one element, the present disclosure is not always limited to the given exemplary embodiments. That is, all the elements may be also selectively coupled or operated as one or more elements.

Furthermore, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the foregoing detailed description, only certain exemplary embodiments of the present disclosure have been shown and described, simply by way of illustration. As those skilled in the art would realize, the described embodiments may be modified in various different ways, all without departing from the spirit or scope of the present disclosure.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A camera module, the camera module comprising:
   a circuit board;
   an image sensor disposed on an upper surface of the circuit board;
   a current carrying part electrically connecting the image sensor and the circuit board;
   a base disposed on the upper surface of the circuit board;
   a circuit element unit arranged at the upper surface of the circuit board and arranged at an outside of the image sensor;
   a cover member arranged at an upper side of the base;
   a lens module arranged at an upper side of the image sensor; and
   a filter interposed between the lens module and the image sensor,
   wherein the base is not overlapped with the image sensor and the current carrying part in a direction of an optical axis,
   wherein the base includes a filter support part supporting the filter, and a cover member support part supporting the cover member,
   wherein the base is formed with an element accommodation part accommodating at least a part of the circuit element unit, and
   wherein the element accommodation part is arranged between the filter support part and the cover member support part.

2. The camera module of claim 1,
   wherein the base includes a first support unit supporting a part of a bottom surface of the filter, a second support unit disposed opposite to a lateral surface of the filter, and a third support unit arranged at the upper surface of the circuit board to connect the first and second support units.

3. The camera module of claim 2, wherein a bottom surface of the first support unit contacts the upper surface of the circuit board.

4. The camera module of claim 2, wherein a width of the first support unit in a direction perpendicular to a direction of the optical axis (hereinafter referred to as 'optical axis direction) is broadened toward an upper side from a lower end of the first support unit.

5. The camera module of claim 2, wherein an upper surface of the first support unit and an inner lateral surface of the first support unit form an acute angle.

6. The camera module of claim 2, wherein a height of the second support unit in the optical axis direction corresponds to a height of the filter in the optical axis direction.

7. The camera module of claim 2, wherein an upper surface of the filter and an upper surface of the second support unit are arranged on one plane.

8. The camera module of claim 2, wherein the filter is spaced apart from the image sensor and the current carrying part.

9. The camera module of claim 2, wherein the filter is an IR absorption filter or an IR reflection filter.

10. The camera module of claim 1, wherein the current carrying part includes a wire coupled to an upper surface of the image sensor and the upper surface of the circuit board.

11. The camera module of claim 10, wherein the wire is arranged at an external side of the image sensor.

12. The camera module of claim 1, wherein the element accommodation part passes through the base in an optical axis direction.

13. The camera module of claim 1, wherein the base is inhibited from being overlapped with the circuit element unit in an optical axis direction.

14. The camera module of claim 1, wherein the element accommodation part includes a first accommodation part arranged at one side of the image sensor and a second accommodation part arranged at the other side of the image sensor.

15. A camera module, the camera module comprising:
    a circuit board;
    an image sensor disposed on an upper surface of the circuit board:
    a current carrying part electrically connecting the image sensor and the circuit board;
    a base disposed on the upper surface of the circuit board;
    a cover member arranged at an upper side of the base;
    a bobbin arranged at an inner side of the cover member;
    a first coil arranged at the bobbin;
    a magnet interposed between the cover member and the bobbin to be opposite to the first coil; and
    a second coil arranged at the base to be opposite to the magnet,
    wherein the base is not overlapped with the image sensor and the current carrying part in a direction of an optical axis.

16. A camera module, the camera module comprising:
    a circuit board;
    an image sensor disposed on an upper surface of the circuit board;
    a current carrying part electrically connecting the image sensor and the circuit board; and
    a base disposed on the upper surface of the circuit board,
    wherein the base is not overlapped with the image sensor and the current carrying part in a direction of an optical axis,
    wherein the circuit element unit includes first to fourth circuit elements, each element mutually spaced apart from the other elements,
    wherein the element accommodation part includes a first accommodation part accommodating the first and second circuit elements, and a second accommodation part accommodating the third and fourth circuit elements, and
    wherein the first accommodation part and the second accommodation part are spaced apart from each other by the base.

17. An optical apparatus, the optical apparatus comprising:
    a main body,
    the camera module of claim 1 arranged at the main body to capture an image of a subject, and a display part arranged at one surface of the main body to output the image captured by the camera module.

* * * * *